(12) United States Patent
McKinney

(10) Patent No.: US 7,525,420 B2
(45) Date of Patent: Apr. 28, 2009

(54) ENVIRONMENTAL EQUIPMENT ALARM CIRCUIT VERIFICATION SYSTEM AND METHOD

(75) Inventor: Jerry L. McKinney, P.O. Box 697, Silsbee, TX (US) 77656

(73) Assignee: Jerry L. McKinney, Silsbee, TX (US)

( * ) Notice: Subject to any disclaimer, the term of this patent is extended or adjusted under 35 U.S.C. 154(b) by 302 days.

(21) Appl. No.: 11/475,813

(22) Filed: Jun. 27, 2006

(65) Prior Publication Data

US 2006/0290487 A1 Dec. 28, 2006

Related U.S. Application Data

(63) Continuation-in-part of application No. 10/003,633, filed on Nov. 2, 2001, now Pat. No. 7,149,701.

(51) Int. Cl.
*G08B 29/00* (2006.01)
(52) U.S. Cl. ............... 340/506; 340/539.1; 340/539.11; 340/539.13; 340/3.1; 340/825.36; 340/825.49
(58) Field of Classification Search .............. 340/506, 340/539.1, 825.36, 825.49, 3.1, 539.11, 539.13
See application file for complete search history.

(56) References Cited

U.S. PATENT DOCUMENTS

| | | | |
|---|---|---|---|
| 4,401,994 A | 8/1983 | Witts et al. | |
| 4,949,263 A | 8/1990 | Jurca | |
| 5,321,396 A | 6/1994 | Lamming et al. | |
| 5,400,246 A | * 3/1995 | Wilson et al. | ................. 700/17 |
| 5,666,294 A | 9/1997 | Takada et al. | |
| 5,673,190 A | 9/1997 | Kakleck et al. | |

(Continued)

OTHER PUBLICATIONS

American Innovations: Bullhorn Revision Bulletin (Bullhorn APM4, APM 4A), Aug. 20, 2001 (11pgs) Campbell Scientific, Inc.: CR10X Measurement and Control System (8 pgs) Microtel: Miscellaneous Articles (8 pgs).

(Continued)

*Primary Examiner*—Daryl C Pope
(74) *Attorney, Agent, or Firm*—Browning Bushman PC

(57) ABSTRACT

A system is provided for verifying operation of a plurality of alarm systems in a plurality of environmental equipment systems that comprises a plurality of first communication nodes and a plurality of second communication nodes. Each second communication node is typically mounted within a yard to about six hundred yards from respective first communication nodes. The first communication nodes send a first verification signal, e.g., a heartbeat signal to verify the alarm systems to the second communication nodes at first predetermined intervals. The plurality of second communication nodes detect when the first verification signal is not received at the first predetermined intervals. The second communication nodes then determine whether to send a malfunction notification to a server base on predetermined criteria. The second communication nodes may send a second heartbeat signal to the server at other predetermined intervals.

18 Claims, 15 Drawing Sheets

U.S. PATENT DOCUMENTS

| | | |
|---|---|---|
| 5,844,601 A | 12/1998 | McPheely et al. |
| 5,926,209 A | 7/1999 | Glatt |
| 5,950,150 A | 9/1999 | Lloyd et al. |
| 6,317,039 B1 | 11/2001 | Thomason |
| 6,505,774 B1 | 1/2003 | Fulcher et al. |
| 6,560,543 B2 | 5/2003 | Wolfe et al. |
| 6,735,630 B1 * | 5/2004 | Gelvin et al. ............... 709/224 |
| 7,002,462 B2 | 2/2006 | Welch |
| 2002/0143596 A1 | 10/2002 | Carmody |
| 2003/0055669 A1 | 3/2003 | Ryan et al. |

OTHER PUBLICATIONS

Strison Wireless System, LLC: Cell-Alert 2000 Remote Transmitting Unit Orenco Systems: Monitoring and Control Devices: (Miscellaneous Articles); May 16, 2003 (4 pgs).

* cited by examiner

ENVIRONMENTAL EQUIPMENT ALARM CIRCUIT VERIFICATION SYSTEM AND METHOD

This application is a continuation-in-part application of U.S. patent application Ser. No. 10/003,633 filed on Nov. 2, 2001 now U.S. Pat. No. 7,149,701.

BACKGROUND OF THE INVENTION

1. Field of the Invention

The present invention relates generally to servicing a very large number of wide spread environmental equipment systems, and more particularly provides a system and method for verifying that the associated alarm circuits for these systems is operational.

2. Description of the Prior Art

Many low volume wastewater treatment plants are owned by individual homeowners or small entities who cannot realistically afford to employ personnel on a daily basis to maintain and repair their wastewater treatment facility.

Due to the high costs of daily service personnel for small systems, environmental regulations may require that manufacturers of small wastewater treatment systems be certified to make, sell, and service suitable systems and then permit the smaller certified systems to be inspected and tested on a less frequent, but periodic, basis, such as quarterly, biannually, and the like. A system may be certified after extensive testing of the system design by a suitable certification entity. Environmental regulations/certifications may also require automatic detection of system problems, e.g., a pump failure or other types of failures. If a problem is detected, regulations/certifications may also require that service personnel arrive within a relatively short time, e.g., within forty-eight hours, to promptly correct the problem. If the systems do not operate properly, then untreated wastewater from the system may eventually reach local streams. If such problems occur frequently with thousands of small systems, then environmental problems could result.

The alarm circuit for the systems, like any other component, may also malfunction or lose power. If the alarm circuit is not operational, then problems may remain undetected. Some states require that the alarm circuit be powered from a different breaker than the environmental equipment so that if the breaker trips due to system malfunction, that the alarm will still operate for providing a warning. In at least one state, regulators additionally want the power for the alarm circuit to be tied to a light or other power circuit used by the homeowner, so that the homeowner will be aware of a power failure on the alarm circuit. Otherwise, the power to the alarm circuit may fail without observation by the homeowner.

Wastewater systems for home owners are generally positioned away from the house. Installation may require running cables and wires such as telephone lines, power lines, and the like. Additional telephone lines may incur additional costs if necessary for sending/receiving data.

Environmental regulations/certifications relating to regular maintenance and inspection, as well as prompt repairs of wastewater treatment systems, are necessary and desirable to protect the environment. In some cases, non-governmental companies, such as NSF®, have been created to provide certification of equipment for compliance with NSF® requirements that relate to regulations, rules, and/or standards for such systems. Certification requirements may relate to maintenance, inspection, and repairs, as well as technical requirements for system outputs/operation such as suspended solids, pH, temperature, dissolved oxygen, color, oily film, foam, noise, BOD, odor, reliability, and the like. Thus, as used herein, environmental regulatory bodies may include governmental agencies, municipal governments, other governmental organizations, and private companies that effectively provide rules, standards, regulations, certifications, and the like for wastewater systems.

Due to such regulations, rules, and standards, which may vary from state to state, monitoring systems are presently available for wastewater treatment systems. Upon sensing a problem in the wastewater system, the monitoring systems may be required to produce a visual and auditory warning that will normally be readily detected by the homeowner. In this way, ideally, the homeowner would promptly contact his service company for repairs, and ideally, the service company would promptly repair the problem within the time limit required by regulation/certification. Some regulations require that the service company name be displayed on the system to permit easier contacting of the service company by the homeowner. Some systems provide a telephone dialer to directly contact the service company in case the homeowner does not recognize the problem immediately or see/hear the monitor warning signals. In some cases, the telephone dialer provides two-way communication to provide the ability for additional testing and remote servicing to thereby save service costs. In some cases, regulations may also require stickers and punch-out cards with the maintenance schedule mounted to the systems to verify that scheduled maintenance and/or testing has been timely performed. Not for profit organizations, such as NSF®, may be used and/or required to certify the type of equipment for suitable operation and certify that the manufacturer provides suitable maintenance plans for the equipment owner and personnel qualified to maintain the equipment. Homeowners often are required to purchase a maintenance plan for a service time, such as two years, with the manufacturers or other service providers who are certified to install and maintain such plans. Homeowners are often required by regulations to renew their initial service contract, which may be for two years, for as long as the equipment is utilized; however, after extensive review and research in this industry, the inventor has identified significant problems that still exist with such systems and that are discussed hereinafter in some detail. For instance, when homeowners obtain a service contract, it is often difficult for homeowners to verify that the required maintenance has actually been performed and that repairs have been made by the service companies in a timely manner.

Consequently, there remains a need to provide an improved monitoring system to protect the environment. Those of skill in the art will appreciate the present invention, which addresses the above problems and other significant problems uncovered by the inventor that are discussed hereinafter.

SUMMARY OF THE INVENTION

Accordingly, it is an objective of the present invention to provide an improved service personnel detection system and method capable of inexpensively monitoring service personnel at large numbers, perhaps tens or hundreds of thousands, of remotely located and/or widespread environmental equipment systems.

An objective of one preferred embodiment of the present invention is to provide an improved system and method that permits responsible parties and/or government agencies to automatically monitor compliance by service providers in providing maintenance and repairs to their environmental equipment systems.

These and other objectives, features, and advantages of the present invention will become apparent from the drawings, the descriptions given herein, and the appended claims. However, it will be understood that above-listed objectives and/or advantages of the invention are intended only as an aid in understanding aspects of the invention, are not intended to limit the invention in any way, and therefore do not form a comprehensive or restrictive list of objectives, and/or features, and/or advantages.

Accordingly, the present invention provides a method for verifying operation of a plurality of alarm systems in a plurality of environmental equipment systems. Each of the plurality of alarm systems may comprise one or more sensors for detecting a malfunction. The method may comprise steps such as mounting a plurality of first communication nodes physically proximate the plurality of alarm systems for the plurality of environmental equipment systems. The plurality of first communication nodes are in electronic communication with respective ones of the plurality of alarm systems. Other steps may or may not comprise mounting a plurality of second communication nodes within wireless communication distance of respective ones of the plurality of first communication nodes and/or providing that the plurality of second communication nodes may electronically communicate with the plurality of first communication nodes and with at least one remotely located server. The method may further comprise programming the plurality of first communication nodes to send a first verification signal to verify operation of respective ones of the plurality of alarm systems to respective of the plurality of second communication nodes at first predetermined intervals, and programming the plurality of second communication nodes to detect when the first verification signal is not received at the first predetermined intervals.

In one embodiment, the method may further comprise providing programming so that the plurality of second communication nodes send a second verification signal to verify operation of the plurality of alarms to at least one remotely located server at second predetermined intervals, and programming the at least one server to detect when the second verification signal is not received at the second predetermined intervals.

The method may further comprise providing programming such that when the second communication node detects that the first verification signal is not received at the first predetermined intervals, then one or more predetermined criteria are checked to determine whether or not the second communication node sends a notification signal to the at least one server that a respective one of the alarm systems is not operational. The one or more predetermined criteria may comprise determining whether the first verification signal is not received for a preselected number of the first predetermined intervals and/or determining whether the notification signal has already been sent to the at least one server.

In one possible embodiment, the method may further comprise providing a cordless telephone connection for the electronic communication between the plurality of first communication nodes and the plurality of second communication nodes. The method may or may not further comprise connecting the plurality of environmental equipment systems to a power line through respective first breakers, connecting the plurality of alarm systems to the power line through respective second breakers, and connecting the plurality of second nodes through respective third breakers.

The present invention may also comprise a system for verifying operation of a plurality of alarm systems in a plurality of environmental equipment systems. The plurality of environmental equipment systems may be serviced by one or more service personnel from one or more service entities. A plurality of responsible parties may be responsible for one or more payments related to respective ones of the plurality of environmental equipment systems. Each of the plurality of alarm systems may comprise one or more sensors for detecting a malfunction. A plurality of first communication nodes may be utilized by the plurality of alarm systems wherein each first communication node is mounted physically proximate to respective ones of the plurality of environmental equipment systems. The system may further comprise a plurality of second communication nodes wherein each second communication node is mounted within wireless communication distance of respective ones of the first communication nodes. The plurality of second communication nodes are operable for electronically communicating with the plurality of first communication nodes and with at least one remotely located server. The system may further comprise programming to provide that the plurality of first communication nodes send a first verification signal to verify operation of respective of the plurality of alarm systems to respective ones of the plurality of second communication nodes at first predetermined intervals and programming to provide that the plurality of second communication nodes detect when the first verification signal is not received at the first predetermined intervals.

While the description above refers to a plurality of alarm systems, plurality of environmental equipment systems, etc., it will be apparent that the invention contemplates singles of such systems.

The present invention may comprise a method for detecting a physical presence of a plurality of service personnel at a plurality of environmental equipment systems positioned at a plurality of different physical locations. The method may comprise one or more steps such as, for instance, positioning a plurality of environmental equipment systems at a plurality of physical locations and/or providing a service personnel detection zone in substantially close proximity to the plurality of physical locations. For instance, this may comprise a detection zone around the environmental equipment systems which could be, in one possible embodiment, from 25 to 500 yards in diameter. If the service personnel enter this zone, they are detected.

Other possible steps might comprise providing one or more data storage units in communication with a plurality of environmental equipment communication systems, such as dialers or the like, and/or utilizing the plurality of environmental equipment communication systems for sending the sensor data for the plurality of environmental equipment systems to the one or more data storage units.

Other steps may comprise providing a service personnel locating system for creating service personnel detection information when the service personnel enter the service personnel detection zones and/or sending the service personnel detection information to one or more data storage units and/or storing the sensor data and service personnel presence detection information in the one or more data storage units.

The service personnel locating system might comprise a plurality of GPS locators, cordless telephone transmitter/receivers or other radio wave detectors, or other types of electromagnetic detectors or the like for the plurality of service personnel, and/or may further comprise designating a geophysical region in a service personnel detection zone such as with a computer or by means of processor programming.

The method may further comprise providing a plurality of GPS location communication systems which may utilize a communication signal path for sending the service personnel detection information that is different from the communication signal path used by the environmental equipment communication system. In one possible embodiment, the environmental equipment communication system comprises a dialer for dialing a telephone number. The plurality of GPS location communication systems may or may not comprise a wireless transmitter such as, for example only, a cellular telephone, or a walkie-talkie, or some other type of radio communication, which may connect by some means to the dialer mechanism, if used. In one possible embodiment, the plurality of GPS locators may be operable for communicating with the plurality of environmental equipment communication systems for transmitting the service personnel detection information through the plurality of environmental equipment communication systems to the one or more data storage units.

In one possible embodiment, the plurality of GPS locators are operable for storing service personnel geophysical location information for a selected time period to create an accumulation of service personnel geophysical location information and for communicating the accumulation of the personnel geophysical location information. For instance, a unit may record the travel path of the service personnel and then download this information along with other servicing information at a later time.

The present invention also comprises a detection system for detecting a physical presence of a plurality of service personnel at a plurality of environmental equipment systems positioned at a plurality of physical locations. Such systems may comprise individual wastewater systems or other types of environmental equipment systems.

The detection system may comprise, for instance, one or more sensors for producing sensor data for each of the plurality of environmental equipment systems and/or one or more data storage units which may be remotely located. A plurality of communication systems for the plurality of environmental equipment systems, such as dialers or other means for communicating, may be used for sending the sensor data to the one or more storage units. A plurality of service personnel detection zones may be designated in close proximity with each of the plurality of environmental equipment systems.

A plurality of service personnel locators may comprise hand-held, or truck mountable or chargeable, or other devices with an electromagnetic wave antenna. The electromagnetic wave antenna may be operable for wireless communication of data related to an electronic determination of entry of the plurality of service personnel into respective of the plurality of service personnel detection zones. For instance, the personnel locator may be a proximity detector of some type, e.g., an RFID, a transponder, a homing signal generator, or the like.

In one possible embodiment, the plurality of service personnel locators may further comprise a plurality of GPS locators. In this case, each of the plurality of service personnel detection zones may be a selectable geophysical area which may be designated with a computer program. For instance, zones of 25 feet to 500 feet around each environmental equipment system may be designated. Any selected geophysical area could be used. A processor or computer program may be used to determine when, and what time, and for how long, the service personnel enters the service personnel detection zone.

In one possible embodiment, the detection system might further comprise a cellular communication system for the plurality of GPS locators. The cellular communication system may be operable for communicating with the storage units such that service personnel's physical presence information is stored within the one or more storage units.

The detection system may further comprise a website for making available the sensor data from each of the plurality of environmental equipment systems for use by at least one of a regulatory body, the plurality of service entities, and the plurality of responsible parties. The system may utilize cordless telephone electronics and/or electronic cameras.

BRIEF DESCRIPTION OF DRAWINGS

For a further understanding of the nature and objects of the present invention, reference should be had to the following detailed description, taken in conjunction with the accompanying drawings, in which like elements may be given the same or analogous reference numbers and wherein.

Figure 1:
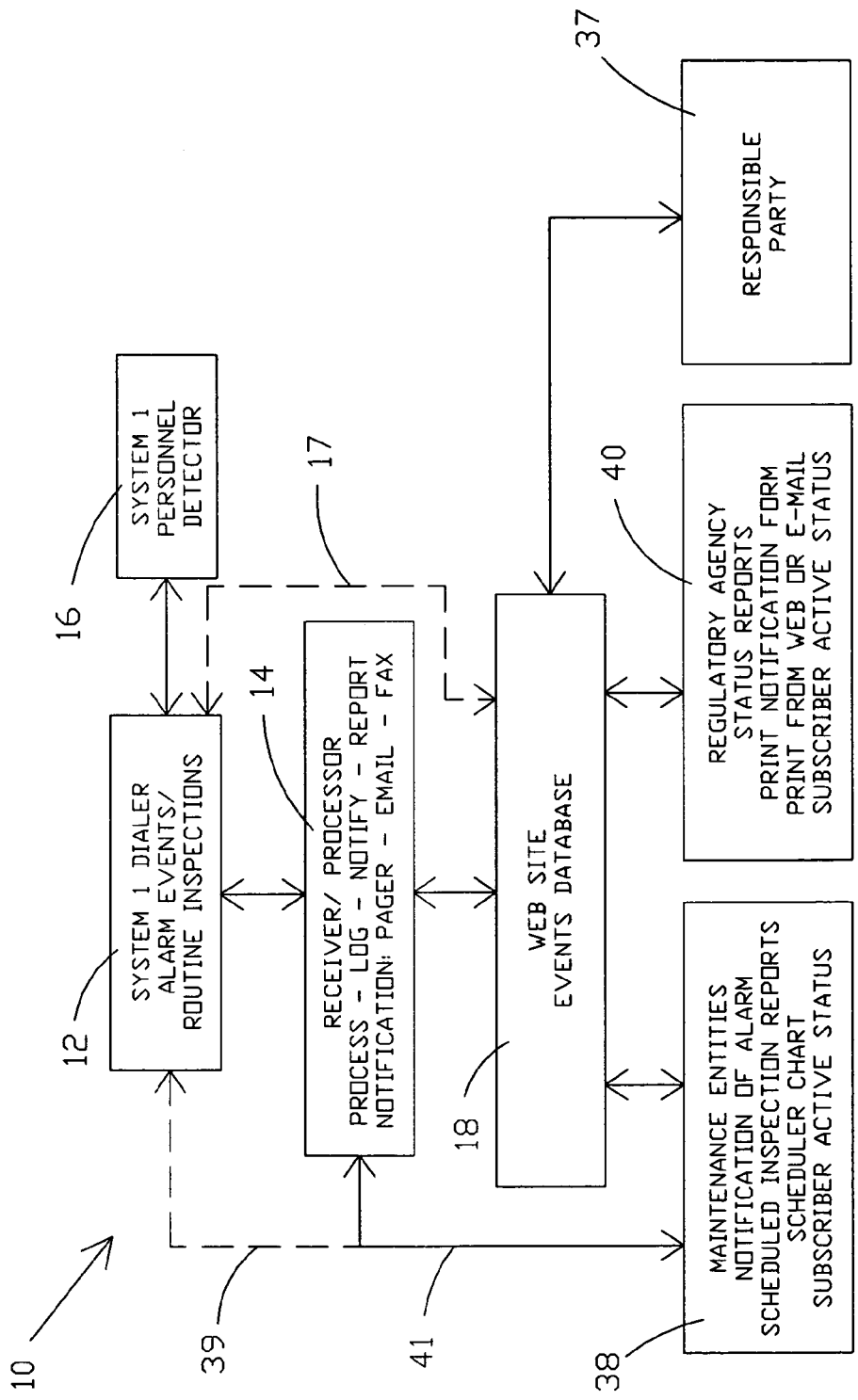
FIG. 1 is a schematic block diagram of an environmental compliance system in accord with the present invention.

While the present invention will be described in connection with presently preferred embodiments, it will be understood that it is not intended to limit the invention to those embodiments. On the contrary, it is intended to cover all alternatives, modifications, and equivalents included within the spirit of the invention.

DETAILED DESCRIPTION OF THE PREFERRED EMBODIMENTS

With small wastewater treatment systems, the systems may be serviced by different service companies, owned by different owners, and located at different locations. Generally, as used herein, different locations will also refer to different portions of land typically owned by different owners. The locations may be adjacent each other or separated by thousands of miles; however, the invention could also be utilized to monitor multiple environmental equipment systems on premises owned by a single owner such as a large plant, refinery, or the like with many different systems spread out over a wide area. The invention could also be utilized by a plurality of such plants or refineries located in different geographical areas of a country or in different countries to thereby permit improved compliance control by appropriate regulatory bodies.

Monitoring systems for environmental equipment such as wastewater treatment systems are known, as discussed hereinbefore; however, the inventor has determined that the following problems still exist that prevent or frustrate reliable environmental regulation oversight by the appropriate environmental regulatory body(s). The regulatory body typically has a limited number of employees and limited funds, and therefore has limited ability to conduct investigations of thousands (or tens or hundreds of thousands) of separately owned home wastewater treatment facilities to verify compliance with regulations. For instance, it is presently impractical for a regulatory body to reliably verify occurrence of equipment failures at each of thousands of homeowner wastewater treatment facilities and whether the equipment failures are timely reported or reported at all. Even for those systems that automatically report failures to the service company, the regulatory body has no practical way of determining if and when repairs have been made. Moreover, if the homeowner decides not to renew a maintenance contract with a certified service company, the regulatory body has little or no practical way of determining the renewal status of the maintenance contract without use of extensive personnel time. If repairs are made, there is also no practical way for the regulatory body to determine whether repairs have been made within the time period, e.g., forty-eight hours, that is required by the regulations. As well, there is no practical way for the regulatory body to determine, without extensive investigative time and money, whether routine inspections are consistently made according to the inspection schedules required by regulations and/or certification rules. For that matter, even the installation owner who may be ultimately responsible for compliance with regulations, such as a homeowner, may not know whether routine inspections in accordance with the terms of the service contract for which the installation owner pays are made as per regulations and/or whether repairs were made in a timely manner.

Figure 2:
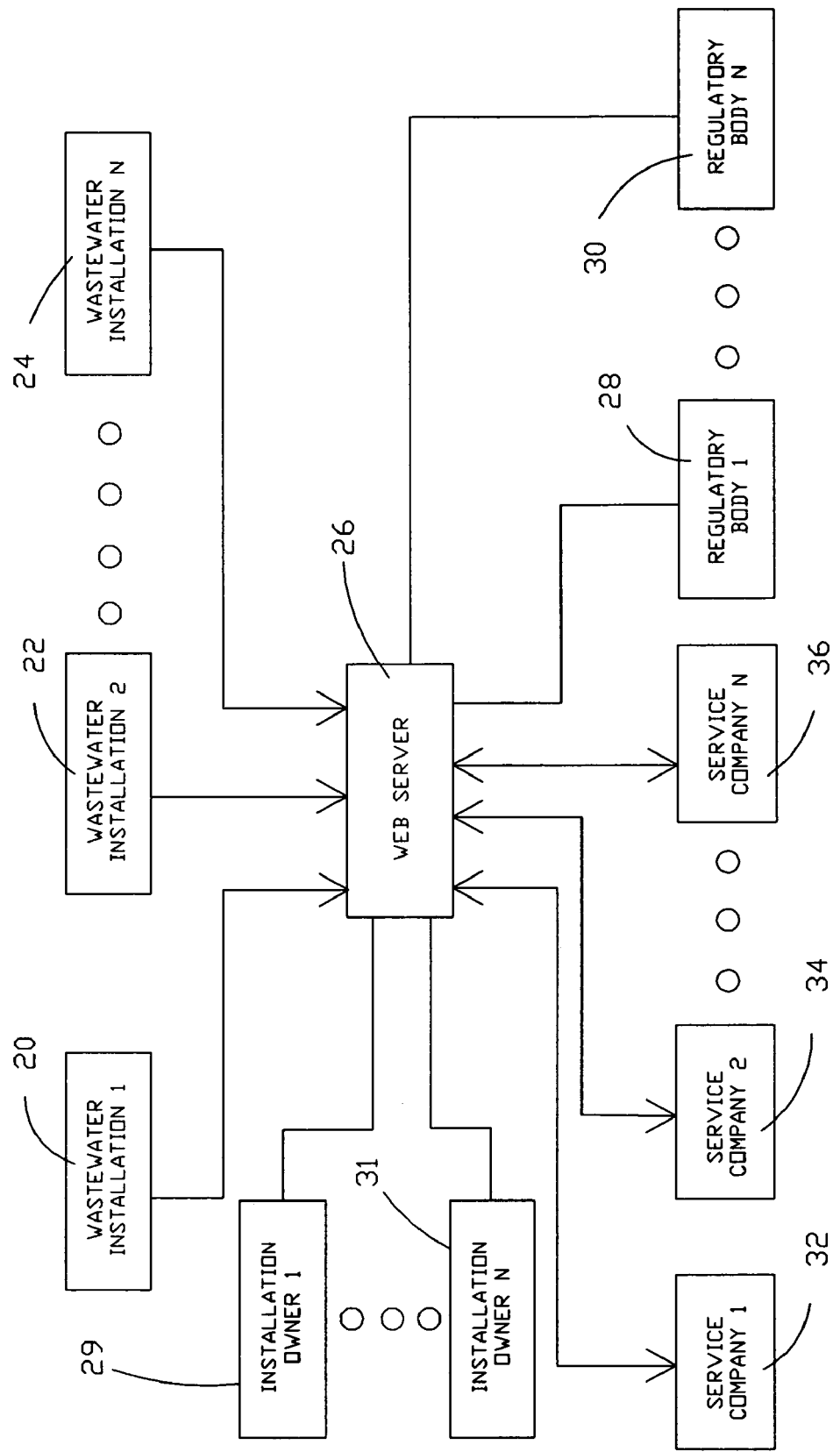
FIG. 2 is a schematic block diagram of one possible preferred embodiment showing a configuration of interconnections for an environmental compliance system in accord with the present invention.

With reference now to the drawings, and more particularly to FIG. 1, there is shown a presently preferred regulatory compliance system 10 in accord with the present invention. Compliance system 10 provides for remote monitoring and notification for use with a plurality of environmental equipment systems with different service companies and different owners. In the presently preferred embodiment, controller 12 may be mounted with each of a plurality of different environmental equipment systems, e.g., wastewater treatment systems, to collect data from each system and communicate the data from the plurality of systems to receiver 14, where the data is collected and stored. In FIG. 1, controller 12 is illustrated for use with a single system 1, but as shown in FIG. 2, a plurality of controllers 12 may preferably be utilized with any number N of wastewater systems as designated by numerals 20, 22, and 24. Thus, FIG. 1 discloses the basic operation of the invention with one environmental equipment system, but the present invention is most highly useful for efficiencies achieved when monitoring large numbers of units in the range of thousands and ten thousands of units or more.

The alarm events detected by controller 12 may be for a wide variety of events that use different sensors for producing an alarm signal. For instance, pump pressures, motor currents/voltages, fluid levels, component temperatures, effluent properties, and the like may be used to indicate normal operation, operation failure, impending failure, need for servicing, and the like. The information for each event may be stored and/or transmitted in any desired manner and may be controlled by suitable programming and/or circuitry.

In a presently preferred embodiment, service personnel detector 16 is provided to detect the physical presence of service personnel who are generally required by regulations to inspect the environmental equipment in accord with an inspection schedule and to timely repair the environmental equipment whenever repair is required according to the different sensors discussed above. Service personnel detector 16 may be used to determine when service starts and/or when the environmental equipment unit is turned on again after being shut down. Such information may be implied the facts detected by programming, such as no previous equipment operation, and/or may require additional input. In this manner, the manufacturer will know for warranty purposes when service began and be able to determine whether the environmental equipment system is still under warranty. Service personnel detector 16 may be provided in numerous different constructions that vary in cost, complexity, amount of data supplied, and so forth. In a presently preferred embodiment, service personnel detector 16 may comprise a single mechanical switch or button. When the service personnel inspects/repairs the environmental equipment system, the service personnel simply pushes the button. Controller 12 and/or receiver/processor 14 may utilize a clock to determine the time/date of the moment the button is pushed by the service personnel, thereby verifying physical presence of the service provider at the environmental equipment installation.

Thus, the clock is utilized to produce a time stamp related to the service, whether the service is an inspection, a repair, or both. To prevent or limit unauthorized use, the button may have a lockout such that it can only be activated once every twenty-four hours. Alternatively, the button may operate with a program defining a time period in which a particular number of button pushes must be made within a specified time period and are used to verify physical presence of an authorized service technician, e.g., twelve button pushes within a one-minute time period. In another embodiment, the button may be covered with a lock to prevent unauthorized use. In another embodiment, the button should be pressed when the service personnel arrives and when the service personnel leaves to provide the length of time of service on location, which may be used for verification purposes. If identity information is also provided as discussed below, then a record of how the service personnel spent his time can be generated such as how much time was spent on each location, the travel time between locations, the sequence in which the service personnel worked on the environmental equipment systems, and so forth.

For instance, a keypad may be provided with a code known by each service personnel whereby the data comprises not only the time/date of service but also may provide the identity of the certified service personnel. Other information may also be provided by input through a keypad such as the type of service or repair, time on location, items repaired, and the like, as desired. Alternatively, authorization cards with magnetic strip readers, bar code readers, tag readers, and the like may be utilized to quickly provide time/date/identity information without the need for any keypad input. In another embodiment, the service personnel detector may be carried by the service personnel. For instance, handheld computers that may contain the service personnel's schedule for the day, equipment needed for repairs, directions to the locations, and the like may be utilized by the service personnel and may have a bar code scanner or other means to verify physical presence and identity of the service personnel. It will be understood that those skilled in the art could design other electronic means for performing the above-described functions. For instance, other means could include GPS or the like mounted to the service truck to perform as service personnel detector 16, which verifies physical presence, time/date, amount of time at the location, and/or other information that may be required by regulations to verify that the equipment has been timely inspected/repaired. Thus, many possible electronic configurations may be utilized to provide the function of service personnel detector 16. A single button with a programmed lockout or time period for a specific number of button presses is a presently preferred embodiment due to the low cost.

Preferably, controller 12 provides a visual or auditory indication to the service personnel, such as an L.E.D. indicator, to verify that his/her presence has been detected and thus ensure that the correct data will be transmitted, as discussed hereinafter.

Central receiver 14 and/or website servers 18 may be utilized in accord with one preferred embodiment of the invention to accumulate data from a plurality of wastewater installations and/or other data producers for distribution and utilization of the data to verify regulatory compliance. FIG. 2 shows one possible basic configuration of such a system whereby a plurality of any number N of wastewater installations as indicated at 20, 22, and 24 communicate with web server 26. Web server 26 may distribute information by an efficient low-cost means to any number N of regulatory bodies as indicated at 28 and 30 and as discussed hereinafter. Web server 26 may also collect data from other sources, such as subscriber contract active/cancelled status, along with other service contract information or other data, from any number N of service companies as indicated at 32, 34, and 36 for each of the plurality of wastewater installations 20, 22, and 24. In one embodiment, service from installation 10 does not start until paid for by the service company who is required to service the wastewater installation of concern. Therefore, it may be assumed that the service company has already been paid by the owner for the service contract. Thus, reports related to service contracts to be forwarded to the regulatory body may be generated automatically based on whether monitoring services utilizing unit 10 has been paid for by the service company. In one embodiment, an independent third party may operate central receiver 14 and notify the environmental body if contracts for monitoring using central receiver 14 and unit 12 are not renewed as discussed in more detail subsequently.

With reference again to FIG. 1, receiver/processor 14 may be utilized to receive data from any number N of environmental equipment installations, such as thousands of wastewater treatment systems as indicated by 20, 22, and 24. In a preferred embodiment, receiver/processor 14 may also be utilized to contact any number N of service companies to notify the respective service company of an alarm from any particular environmental equipment installation that requires servicing and/or any other responsible or interested party such as homeowners. Alternatively, website 18 may be utilized to provide alarm notifications to interested parties such as the appropriate service company 38.

Receiver/processor 14 and website 18 may be combined and effectively operate utilizing common electronic equipment or may be located at different locations. Website 18 may be a website on the Internet, a network, or a bulletin board accessible through a modem, an ISP, or any other suitable means for communicating from computer to computer. Alternatively, and/or simultaneously with receiver/processor 14, website 18 may receive information directly from controller 12 as indicated by communication line 17 which may be a telephone computer link up or any other data communication channel.

In response to an alarm notification, receiver/processor 14 and/or website 18 may provide a central monitoring station that identifies the location, type of alarm event and, if required, immediate notification to any interested party such as a designated service company either from receiver/processor 14, from website 18, or by other suitable means, as discussed in more detail subsequently. Service calls detected by service personnel detector 16 that are designated as routine inspections are preferably time-stamped and logged without the need to provide immediate notification to the service company, unless otherwise requested by the service company or other interested parties, whereby such an option may be provided on website 18. Notification warnings may be sent from receiver/processor 14 and/or website 18 by e-mail/fax/pager/program to the appropriate service company and/or to other interested parties by other suitable means, if desired.

Although not the preferred embodiment, other communication interconnections may be utilized. For instance, transmitter 12 might also connect directly to service company 38 to provide a warning or notice of event as indicated by dotted communication line 39; however, in this case appropriate communications should be provided to update the records kept by receiver/processor 14. As one example for this configuration, transmitter 12 may also transmit event data to receiver/processor 14 and/or service company 38 may transmit data to receiver/processor 14 through solid communication line 41. Two-way communication may also be effected from maintenance entity 38 to controller 12 either by communication line 39 or communication line 41 to allow for testing, measurements, and controlling of the particular type of environmental installation involved. Other communication networks may be utilized for processing, forwarding, and storing data in accord with the methods of the invention as discussed herein.

Along with event data related to warnings, repairs, and inspections, receiver/processor 14 and/or website 18 may also receive and store data related to service contracts for each environmental installation and thereby automatically route the alarm to the correct environmental equipment installation. Receiver/processor 14 and/or website 18 stores the service contract data including renewal status and can send out renewal notices either directly to the homeowner or simply notify the appropriate service company. If the service contract is not renewed, as will normally be required by regulations, then receiver/processor 14 and/or website 18 stores this contract status information and preferably forwards or makes available the contract status information to regulatory agency 40. Responsible parties may also be notified. Regulatory agency 40 preferably may utilize software or systems in accord with the present invention that permit notification to the responsible parties, such as the homeowner and/or service company whose address and/or other contact information is stored by receiver/processor 14 and/or website 18, of noncompliance with regulations that require the homeowner to renew the service contract.

For example, in a preferred embodiment regulatory agency 40 may download form letters filled in and ready to mail. If desired, receiver/processor 14 and/or website 18 could also be utilized to automatically forward the form letter to the homeowner or responsible party on behalf of the regulatory agency and/or notify the agency by e-mail or other means that the noncompliance letter/e-mail/fax or the like has been sent and the date of mailing. Other types of communication besides form letters are also possible. When service contracts are renewed, the respective service company 38 notifies receiver/processor 14 and/or website 18 of the status, time period, particular installation, ownership and responsibility data, addresses, names, and so forth for the new contract. If monitoring utilizing unit 10 is not renewed, or if it is renewed, then such information may be implied while providing options to note changes. As discussed hereinafter, the respective service company and/or responsible party may simply fill out a suitable on-line form in a website to effect this action. If desired, verification of contract renewal and terms thereof can be sent by receiver/processor 14 and/or website 18 to the service company and homeowner or other responsible party by any messaging means such as fax, e-mail, or the like.

Regulatory agency 40 can also obtain status reports regarding timely repairs, e.g., the exact time when the sensor originally signaled that repair was necessary and the exact time when the service personnel actually arrived at the environmental equipment system location. Thus, in one embodiment of the invention a status report can be printed by regulatory agency 40 that includes all repairs that were not made within the required time or that may not have been made at all. If desired, different levels of urgency can be assigned to the situations based on the length of time the repairs are overdue, whether repairs have been made at all, and/or repair history for a particular installation, a particular service provider, or a particular service personnel. Thus, form letters covering the different status types can be sent out automatically from regulatory agency 40 to the responsible parties.

In a similar manner, regulatory agency 40 can conveniently monitor whether the inspections for the environmental equipment systems have been timely performed. Receiver/processor 14 and/or website 18 maintains the schedule required by regulations for inspection for each of the plurality of environmental systems and also records when service personnel has arrived at the location. Suitable means may be provided to determine whether a service call is for repair, for inspection, or for both in conjunction with service personnel detector 16. For instance, if no repair warning has been sent, the service call may be presumed by programming of receiver/processor 14 and/or website 18 to be a routine inspection. Thus, because data is available regarding when inspections are required, as well as when inspections have been made, regulatory agency 40 can determine, by automatic control, exactly what level of compliance with the regulations has been achieved. Again, automatic notifications to responsible parties can be sent out from the regulatory agency to the appropriate responsible entity for nonconformance. Such notices may go to the service company if it appears the service company did not perform as per the service contract requirements. If desired, conformance letters could also be sent out to those homeowners and service companies providing conforming service as proof of a history of past conformance to regulations and/or history of repairs, inspections, and services as may be desired by other parties such as purchasers of the houses, real estate agencies, and the like.

System 10 may be utilized to signal when a wastewater system has been taken out of service or when service is initiated for the first time after manufacture or after the system has been out of service for repairs.

To significantly aid service companies 38, website 18 may also be utilized by service companies 38 to provide a record and an easily accessible schedule for each environmental equipment system for which the service company provides service. This schedule can be utilized in setting up work schedules for service personnel and so forth and provides a significant bookkeeping/logistics convenience for service companies 38. Additional records for each equipment system, including past history, anticipated types of repairs, maps, and the like, might be accessible by the appropriate service company and/or its service personnel. The service company may also be able to track personnel, determine efficiencies, determine time on locations, and so forth as may be useful for improved management.

Responsible parties 37 (See FIG. 1) for the environmental systems, such as wastewater systems, or any number of homeowners 29 and 31 or any other responsible parties (See FIG. 2), will also appreciate the present invention which permits the homeowner or responsible party to view details such as past history, alarms, times of response, time on location, scheduled maintenance, and the like, for their own wastewater system through website 18 and/or web server 26 and/or any other suitable communication means available now or available in the future. For security reasons, access to website 18 is preferably limited for responsible parties to information about their own wastewater systems. Responsible party 37, such as a the homeowner, normally makes a service contract with and pays a service company to provide regular maintenance as well as make repairs within the required response time. It is normally difficult for the homeowner or responsible party to verify what has actually been done in return for the service contract payments. Without use of the present invention, service personnel often come and go without their presence being known by the homeowner. However, as discussed hereinbefore, system 10 automatically accumulates and records this information and may, if desired, provide this information to the homeowner or other responsible person. For instance, responsible parties or homeowners might log into website 18 such as through server 26 or otherwise communicate to obtain such information. In this way, for instance, the homeowner can determine when maintenance was required and when or whether the service company actually performed these services. As well, if an alarm occurs, then the homeowner can determine when or whether repairs were made. If available, more detailed information such as details about repairs, the name and number of the service person or persons assigned to do work, and the like can be provided online for the homeowners. If desired, system 14 may be utilized to send notifications/alerts to the homeowners or responsible parties of any type, e.g., notification that an alarm went off, notification that repairs were or were not made within the required time period, notification that scheduled maintenance was performed within the required time period or not, and so forth.

If desired, system 14 may also provide for online contracts or sales with service providers of choice whereby the homeowner or other responsible party can contract with, change contracts, or the like, with a desired service company online through website 18. Moreover system 14 may permit communications between the service companies and responsible parties concerning matters such as maintenance, contract information, repairs, complaints, commendations, and the like. If desired, service companies may place their own link on website 18 for advertising and the like. Thus, the present invention provides the capability for much greater oversight and control over the environmental systems, such as a wastewater system, by the responsible party.

Environmental equipment systems, such as wastewater systems, 20, 22, and 24, may be any environmental equipment system for which environmental related regulatory oversight is required. For instance, according to ANSI/NSF International Standard 40 definitions, a residential wastewater treatment system is considered to be an organized and coordinated system of components that functions to treat wastewater generated by individual residences. A subdivision may have a plurality of residential wastewater treatment systems, each of which has to be in compliance with environmental regulatory requirements. Each wastewater treatment system is then considered an environmental equipment system for purposes of the present specification. As used herein, servicing includes maintenance, inspection, repairs, or others type of labor-related services when environmental equipment systems are involved whether or not repairs are actually made, initiated, delayed, or completed, and even if no action is taken. Servicing may also include remote repairs and monitoring. Service personnel provide the labor of servicing that should be made in a timely manner. Depending on regulatory requirements, service personnel may be required to be authorized representatives. Service personnel may be comprised of organizations, groups, individuals, or other entities that may be required to be authorized to distribute sell, install, and/or service environmental equipment systems such as wastewater treatment systems. Service companies may typically provide such service personnel. Service companies may include organizations, groups, individuals, or other entities. Generally, an owner for each environmental equipment system may be an individual, municipality, government, corporate, or other type of entity. The owner may typically be responsible for servicing such as the labor of maintenance/repairs/inspections and so forth of the environmental equipment system and may have contracted to have certified servicing performed by a service company utilizing certified personnel. The service company, which may be the owner's agent who has contracted to provide the service, may then also be a responsible party.

According to ISO Guide 2, which sets the internationally accepted definitions for product testing and certification, among many other things, the definition of a third-party is as follows: Person or body that is recognized as being independent of the parties involved, as concerns the issue in question. For instance NSF® is a third party that provides certification services but not does not sell the units or service the units in question. In one embodiment of the invention, receiver 14 and/or website 18 is operated by a third-party that reports to regulatory agency 40 regarding compliance or noncompliance with regulations. Preferably communications are automatic, but the third party may use any communication means including written reports and the like as may be utilized by the third-party to the regulatory body. The third-party is recognized as independent because the third party has no clear benefit if the duty to provide the labor of services such as repairs and inspections in accordance with regulations is not met. Preferably, the third-party receives payment for reliable reporting to thereby provide motivation to reliably and consistently report noncompliance. Thus, a third party should be sufficiently independent of any motivation to avoid reporting noncompliance that a government body or certification body might reasonably recognize the third party as being independent. On the other hand, a service provider or environmental equipment system owner would not be independent because such parties could significantly benefit from cost savings if repairs or inspections are not made, or if the repairs/inspections are not made in a timely manner, or if the noncompliance with regulations was simply not reported. Thus, a third party would have no motivation to avoid reporting noncompliance with regulations and would not benefit by saving costs such as a service provider or system owner might. The main motivation for the third-party is to accurately track the actual status of compliance with regulations and the third-party may be paid for that service, just as other independent bodies such as companies such as NSF® are paid to provide independent certification. Thus, if desired, a third party entity, government body, or other independent company could be utilized to operate system 10 as a third party. For that matter, a purely automatic system may comply with the definition of a third-party because a machine has no motivation except to do that for which it is programmed. In this case, an independent third party might be required verify and certify operation of the machine to verify that the machine, such as system 10, is operating correctly to make accurate reports. Therefore, for purposes of the present specification a third-party may be an independent person, entity, or body, or may be a certified system such as system 10. A third party should be sufficiently independent that the third party does not benefit from noncompliance and should have a motivation to accurately report noncompliance with regulations. Such motivation might include as payment for accurate and reliable reporting. A third-party for this specification might therefore also comprise a system, such as system 10, or components thereof, owned and/or operated by an interested party if system 10 is certified or checked by an independent third-party and verified to act accurately and independently to determine whether or not the environmental regulations related to environmental equipment systems are being complied with.

Figure 3:
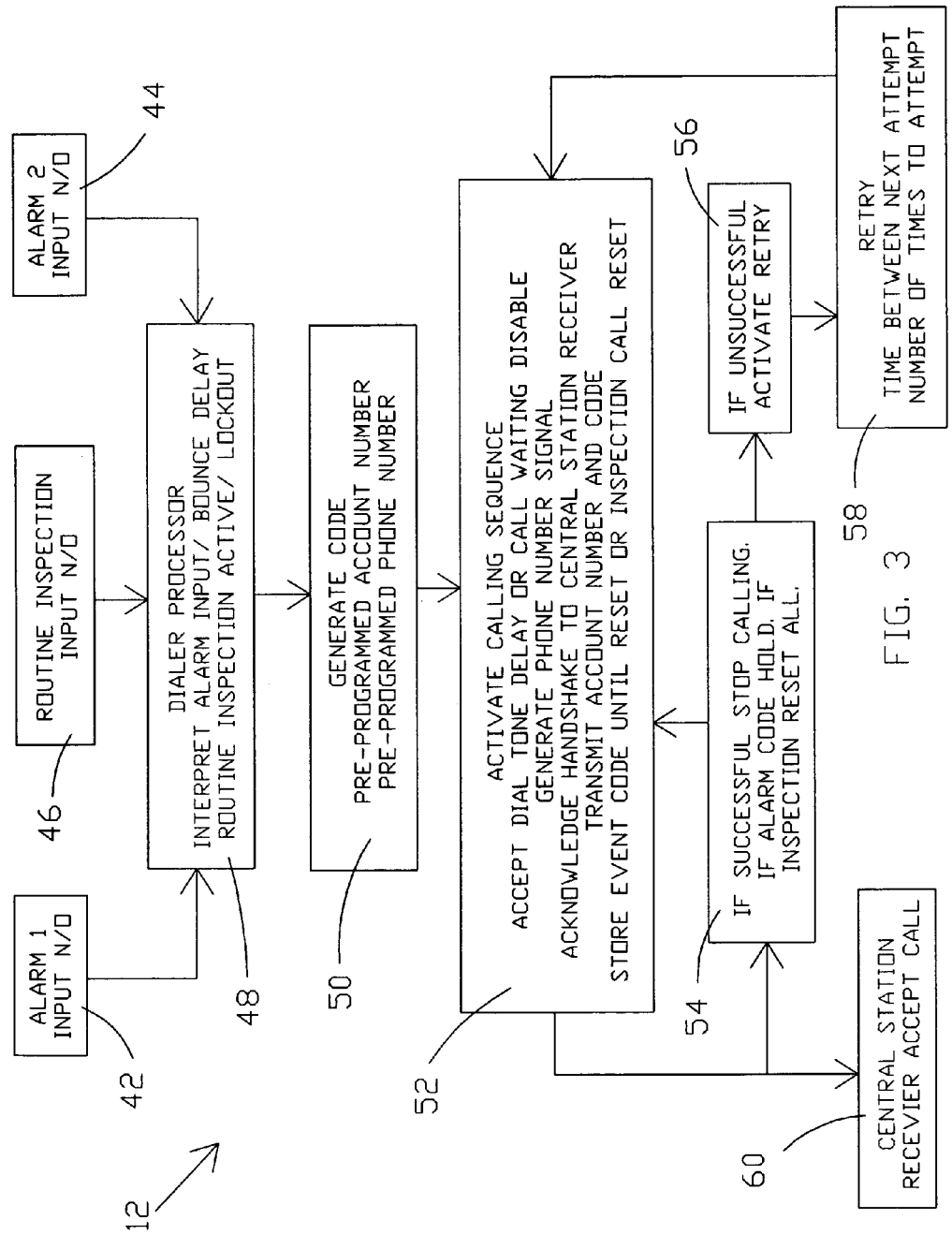
FIG. 3 is a schematic flow diagram relating to operation of an event data transmitter that may be utilized by each of a plurality of environmental equipment systems in accord with one possible preferred embodiment of the present invention.
Figure 4:
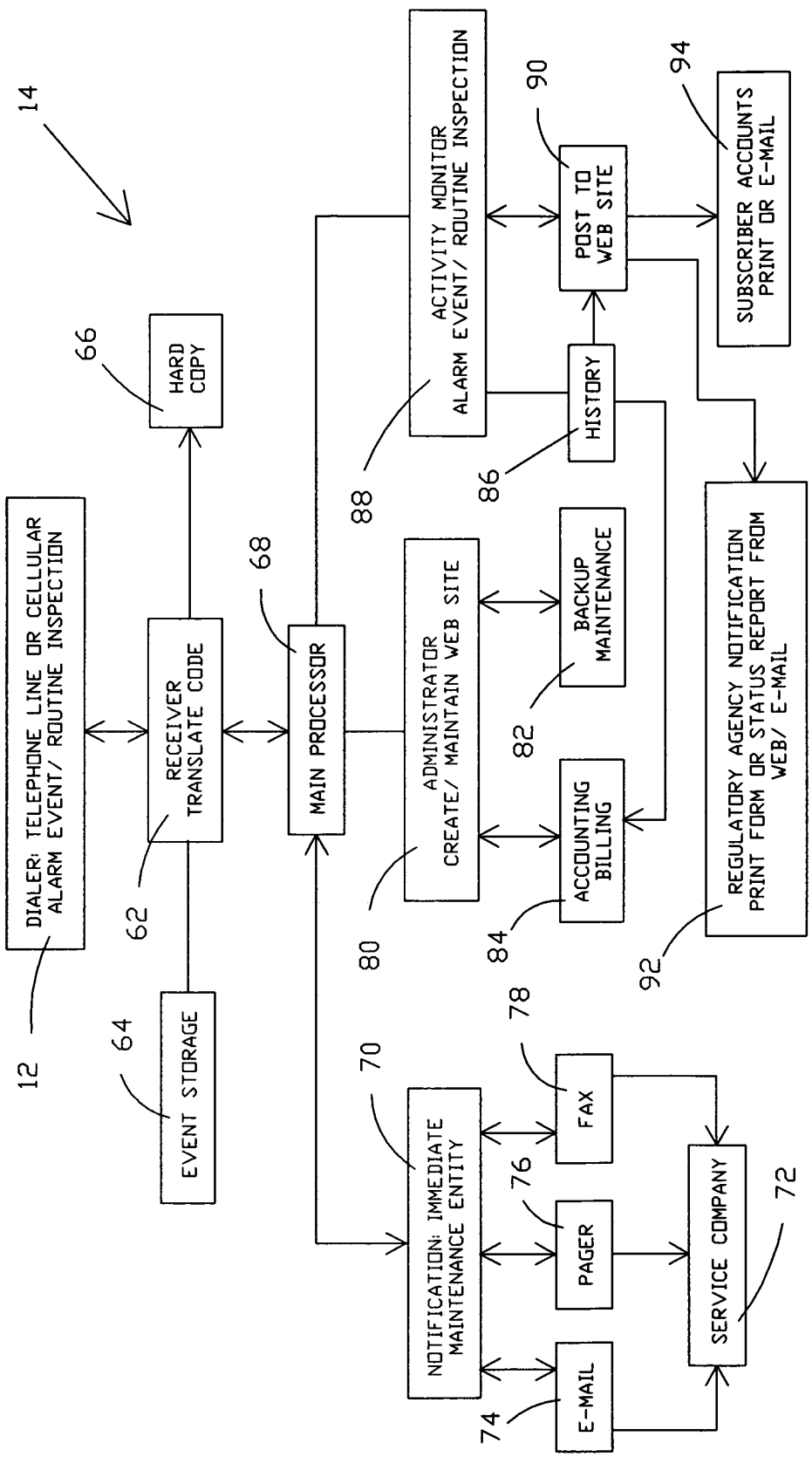
FIG. 4 is a schematic flow diagram relating to operation of an event data receiver that may be utilized to receive data from a plurality of event data transmitters such as those described by FIG. 4 in accord with one possible preferred embodiment.
Figure 5:
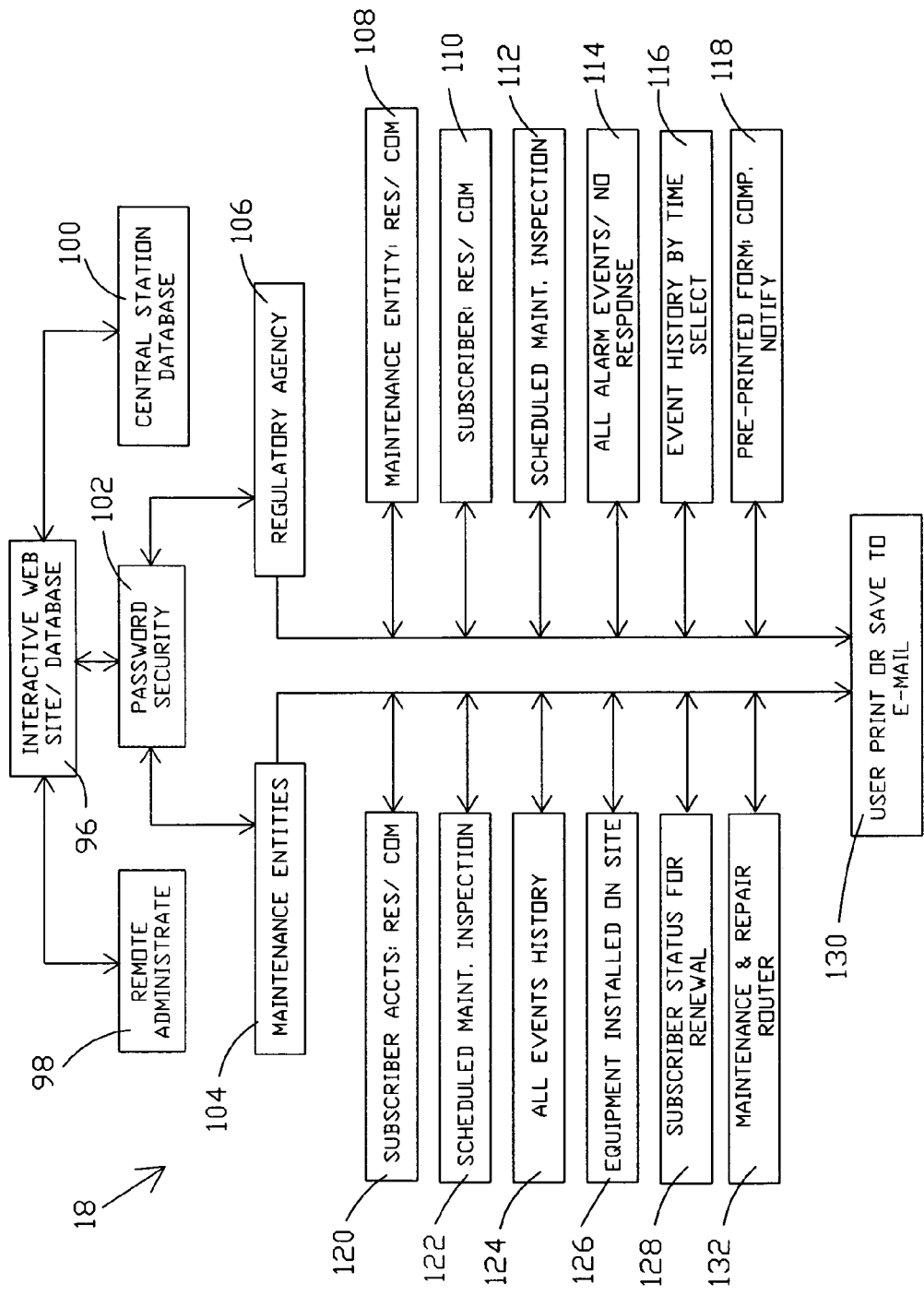
FIG. 5 is a block diagram for a website that may be accessed by a regulatory agent to obtain data related to compliance with regulatory requirements, such as scheduled maintenance, timely repairs, maintenance contracts, and responsible parties, for a plurality of environmental equipment systems located in different locations in accord with one possible embodiment of the present invention.

FIG. 3, FIG. 4, and FIG. 5 provide additional details for a presently preferred regulatory compliance system 10 as discussed in general terms hereinbefore in relation to FIG. 1 and FIG. 2.

FIG. 3 provides a schematical breakdown of certain features/functions of controller 12, such as the transmitter and/or dialer 12 functions. As indicated and discussed above, various types of inputs may be provided from sensors, such as equipment failure alarms 42 and 44. As discussed above, many different types of service personnel detectors 16 can be utilized to provide routine inspection/repair service call input 46. For example, alarms 42 may include two amperage sensors that sense over currents in pumps in wastewater systems whereby less expensive service is needed before the pumps break down and require major repairs. If a wastewater system has two pumps that may be used alternatively, then the spare engine could be used while one pump is being repaired. Utilizing two over current sensors with one sensor one each pump would allow continued operation of the facility, while shutting down either pump that is drawing too much current. Dialer/processor 48 then sends a message to report the over current condition so that repairs can be made. Other controls shift the work load to the other pumps.

For initial processing of event data, dialer/processor 48 may be programmed to sense short-term false alarms. For instance, with certain sensors a signal may occur that if monitored for a longer period, perhaps two minutes, will then go back to a normal range. For instance, a fluid level may rise momentarily above the trigger level but then soon drop back into the normal range whereby service is not indicated. Thus, false alarms can be reduced in some cases by programming delays and signal averaging into the design of dialer/processor 48. Thus, dialer/processor 48 may be utilized to interpret the alarm input and be programmed to respond accordingly. As another example, dialer/processor 48 may be utilized to provide bounce delays for a mechanical button or switch such as a programmed lockout time period or other means after an initial contact to verify that the service personnel actually activated the signal. Therefore, input 46, which may, for instance, be provided by personnel detector 16 (See also FIG. 1) may therefore be from a single switch or button, multiple switches such as a key pad, an electronic reader of some type, or any other means to indicate the actual physical presence of a service provider. Input 46 may also include data that identifies the particular service personnel such as a tag, magnetic strip, bar code, or the like.

Processor/dialer 48 or other components in receiver 14 of FIG. 1 may be utilized to determine the type of service provided by the service personnel, e.g., repair or routine inspection or both. Thus, processor 48 may refer to whether an alarm is active or not to interpret the meaning of the call. If a keypad is utilized, the service personnel could also indicate this information by inputting the appropriate code for either a repair service call, routine inspection, or both.

Dialer 50 may be used to send data to receiver 14 of FIG. 1 either by a standard telephone line or by cellular telephone where a standard telephone line is not available or by any suitable communication means. While a dialer is a low-cost embodiment in accord with a presently preferred embodiment, any other type of data communication line could be utilized. If desired, dialer 50 may utilize the telephone communications industry standard 4+2 format. Dialer 50 may in one embodiment utilize a code, such as a hexadecimal code or other type of code, that identifies a unique account number associated with the particular environmental equipment system, the alarm event, and/or the onsite report recognition of the physical presence of a service personnel. Dialer 50 may contain the phone number to be dialed in memory. The phone number may be changed by two-way communication from receiver 14, as desired. Account information will be transmitted that permits receiver 14 and/or website 18 to identify the particular environmental equipment system, type thereof, manufacturer, owner, installer, service contract status, service company, and so forth.

Programming of dialer 50 is indicated at blocks 52, 54, 56, 58, and 60 to thereby control the operation of dialer 50 in a presently preferred manner. For instance, the type of phone line connection may be programmed therein for receiver 14, handshake connections, protocol for data, decision-making as to resetting of alarms, and so forth. If a successful call is completed as indicated at 54, no further calls are needed, and depending on whether the code is for an alarm or for an inspection, a reset may or may not be made. If the call is not successful, as indicated at 56, then retry routine 58 may be activated whereby the time between the next retry is determined along with the number of retries attempted. For instance, phone lines may be down, and therefore routine 58 may delay further attempts until the next day after a certain number of attempts have been made. Busy signals may produce a different response. If receiver 14 accepts the call as indicated at 60, then the appropriate resets are made. While this program of operation is presently desired, other possible dialer operation formats may also be used.

FIG. 4 provides an overview of a presently preferred embodiment of receiver/processor 14. As discussed earlier, dialer 12, or another type of transmitter, sends data to receiver 62 by telephone lines, cellular transmission, or any other type of data link. Various communication checks such as parity checks, acknowledgments, and the like can be used to eliminate transmission of incorrect data.

While receiver 62 is preferably a single receiver, receiver 62 might also comprise multiple receivers that act together. For instance, there could be a separate receiver 62 for different geographical areas or countries, which then transmit the data to another receiver or group of receivers; however, in one presently preferred embodiment, all data is preferably stored in a manner to be accessible in real time by the regulatory body without the need to search multiple locations and/or repeatably update a plurality of remote data collecting systems 62 to a central station or website 18. The collected data, as discussed hereinbefore, relates to events that occur at each of a plurality of environmental equipment installations. Upon receipt, the data is translated by receiver 62 and the raw data is preferably stored in a data storage medium 64. Receiver 62 may also comprise a clock to time and date the receipt of each event. If desired, a time stamp may already have been attached to the event data from dialer 12, as discussed above. If no previous time stamp was produced, or even if one was produced, the time stamp of receiver 62 indicates when the data was received by receiver 62. The time-stamp information is utilized to determine timely compliance with inspection requirements and repairs. If desired, a hard copy of all events for any desired period or for each event logged may be printed at 66. Main processor 68 is programmed to make decisions upon receipt of the data. For instance, if a warning event occurs such that repairs are necessary, then notification is made at 70. Processor 68 stores information that permits contacting the particular service company 72 that has an existing contract for servicing the particular environmental equipment system for which a repair warning event has been received.

Notification module 70 may comprise programmed equipment and/or may comprise a programming module operable to contact service company 72 by virtually any desired communication format such as, for instance, e-mail 74, pager 76, and/or fax 78. By communications with the website 18, the service company may have an option to select a desired communication means. In one embodiment, if desired, a selected service personnel could be directly paged by notification module for a particular group of environmental equipment, although service company 72 may typically prefer to have all communications go therethrough to continually update event logging records.

Main processor 68 may be programmed by system administrator 80, who may contact main processor 68 through website 18, by an Internet network connection, LAN, or another type of network connection. Alternately, system administrator 80 may contact or operate the website through main processor 68. Backup maintenance 82 for the system may be supplied depending on the particular configuration utilized and may comprise backup programs, data, and the like to restore the system in case of errors, power failures, and the like. Administrator 80 also preferably sets up accounting/billing module 84. Accounting/billing module 84 monitors the number of events from history module 86 and may determine pricing based on the number of data events that occur for each environmental equipment system in conjunction with other monthly fees and services provided.

Activity monitor 88 may be used to classify the events and store a log of events. For instance, the events received by receiver 62 might be classified as to whether they are alarm events, routine inspections, system start-up, system shutdown, contract renewal, and so forth. The cataloged data may be supplied to history module 86 where it may be utilized for accounting/billing purposes. Data may also be posted to website 18 as indicated at 90. In a preferred embodiment, from website 18 the regulatory agency can receive notifications, make inquiries, print forms, obtain status reports, and so forth as desired. The regulatory agency could also send messages to the respective homeowners, responsible parties, or service company through the website, as desired. Subscribers 94, such as service companies who subscribe to features such as schedulers that keep track of all inspection requirements for each unit, may also contact the website.

FIG. 5 provides an overview of various preferred functions of website 18 that may be produced by one or more servers and with data storage at one or more locations. Thus, interactive website/database 96 may comprise electronic equipment located at the same general location as receiver/processor 16 and/or be located at different locations. Thus, website 18 servers and receiver/processor 16 may or may not utilize common equipment, as desired, and may or may not be located at the same physical location.

An administrator may remotely operate interactive website 96 as indicated at 98. Website 18 may utilize central station database 100 for data storage and data backup storage, as desired. Preferably, access to website 98 is by unique password security as indicated at 102. Thus, each maintenance entity 104 and each regulatory agency 106 and if desired, each responsible party such as the homeowner has their own password. The passwords may preferably provide, or be associated with, different levels of access and/or services.

Items 108, 110, 112, 114, 116, and 118 give examples of some presently preferred services available to the regulatory agency in accord with the present invention. For instance, the regulatory agency may obtain service company information 108, such as listings of environmental units under contract, the make of the units, the dealer/installer, the address or physical location of the units, the history of service for the service company in percentages, noncompliance past history, and so forth. Likewise, owner information 110 is available, such as addresses and names or, if the owner is not responsible, other parties, such as operators, companies, or local governments. Likewise, a history of past events, responses, and so forth as well as a history of equipment failures may be obtained. This information may also be used as one factor in extended time verification of operation or for granting certification for certain types of units. Scheduled maintenance/inspection information 112 is readily available, and histories for each type of equipment can be obtained. From this and event information such as the physical presence data and/or data regarding classification as to inspection/repair visits, the regulatory agency can also determine whether inspections have been timely performed in compliance with the regulations. The regulatory agency can also obtain listings of all alarm events as indicated at 114, the times of the related responses, or whether any response has been made. Histories with respect to particular service companies, regulators, manufacturers, and/or owners can also be obtained. Event histories may also be retrieved for particular time periods as indicated at 116. To reduce the time required for the regulatory agency, preprinted noncompliance forms can be produced at 118 that are addressed to the responsible parties. It will be understood that the data can be organized and retrieved in many different ways and formats and that many options may be provided for convenience and speed of operation by the regulatory agency. An oversight agency, through password supervision, may access accounts of a local agency and review their status. Searching may be made in many different ways such as by specific time period, name, equipment type, subscriber listings, service company, and so forth. Thus, the present invention also allows an oversight agency to review local agency compliance.

Likewise, service companies 104 can obtain many helpful and valuable services through interactive website 96 as indicated at 120, 122, 124, 126, 128, and 130. Moreover, service companies can enter a significant amount of data into website 96 for use by the service companies in the future for scheduling such as future inspections, future contract renewal requests for homeowners, and the like. Thus, at subscriber information 120, information about the service company is input including contact information, location, and so forth. Scheduled maintenance/inspection schedules are available at 122 and may be provided as a convenience for companies that might otherwise pay significant sums to develop or purchase software for scheduling purposes. The website may be used by companies to generate bills, renewal notices, service notices, and other comments or advisories to customers or other interested parties. In one embodiment, service personnel that are in a particular area for other reasons such as repairs may be able to log into or have the service company log into the scheduler to determine if efficiencies can be achieved by performing inspections while the service personnel is already in that area. Thus, scheduler function 122 is likely to reduce operating costs for the service company. Service companies may also be able to obtain event histories 124 relating to histories of operation, timely response, timely repair, records of repair for each service personnel and for each environmental equipment installation, types of installations, and so forth. If desired, the data may be limited to data related to those service companies' operations. The type of equipment installed on each site may be available at 126 along with repair/maintenance history and so forth. At 128, the service company inputs information about the subscriber contract status and may have preprinted forms mailed to the subscriber before the contract expires, with perhaps standardized warning letters to advise about regulations requiring renewal of the service contract. The users may print or save the above and other information to e-mail as desired as indicated at 130.

Another benefit to maintenance entities, if desired, is an online maintenance and repair scheduler and/or router 132.

With this, the maintenance company and/or the serviceman directly can receive a daily (two days, weekly) schedule for each serviceman which includes the locations for the day and, if desired, one or more maps of any desired detail which shows driving directions to each location. The cost savings to the maintenance entity are significant.

Many options are available for customizing the work schedules to the needs of the maintenance company needs. For instance, driving times, anticipated on-site maintenance times, anticipated on-site repair times, and/or other factors, can automatically be considered when automatically generating the work schedule for each service person. Scheduler 132 may provide a route that preferably limits driving time, which information is available in many map programs, and maximizes on-site time, e.g., provides a route where adjacent locations are given priority. Scheduler 132 may also provide exceptions, e.g., repairs due to alarms that must be made within a short time period thereby necessitating a longer drive to make the repair within the desired time period. As well, if particular service personnel are in particular areas, then the program may use those personnel because those service personnel may more efficient than others. Scheduler 132 may operate to prepare a schedule based around the work schedule of each serviceperson. For instance, if a serviceperson works only a few hours one day, then scheduler 132 would provide a limited schedule to that service person that day. If a serviceperson is on vacation, then scheduler 132 may be programmed to automatically alter the schedules of other service personnel.

Figure 6:
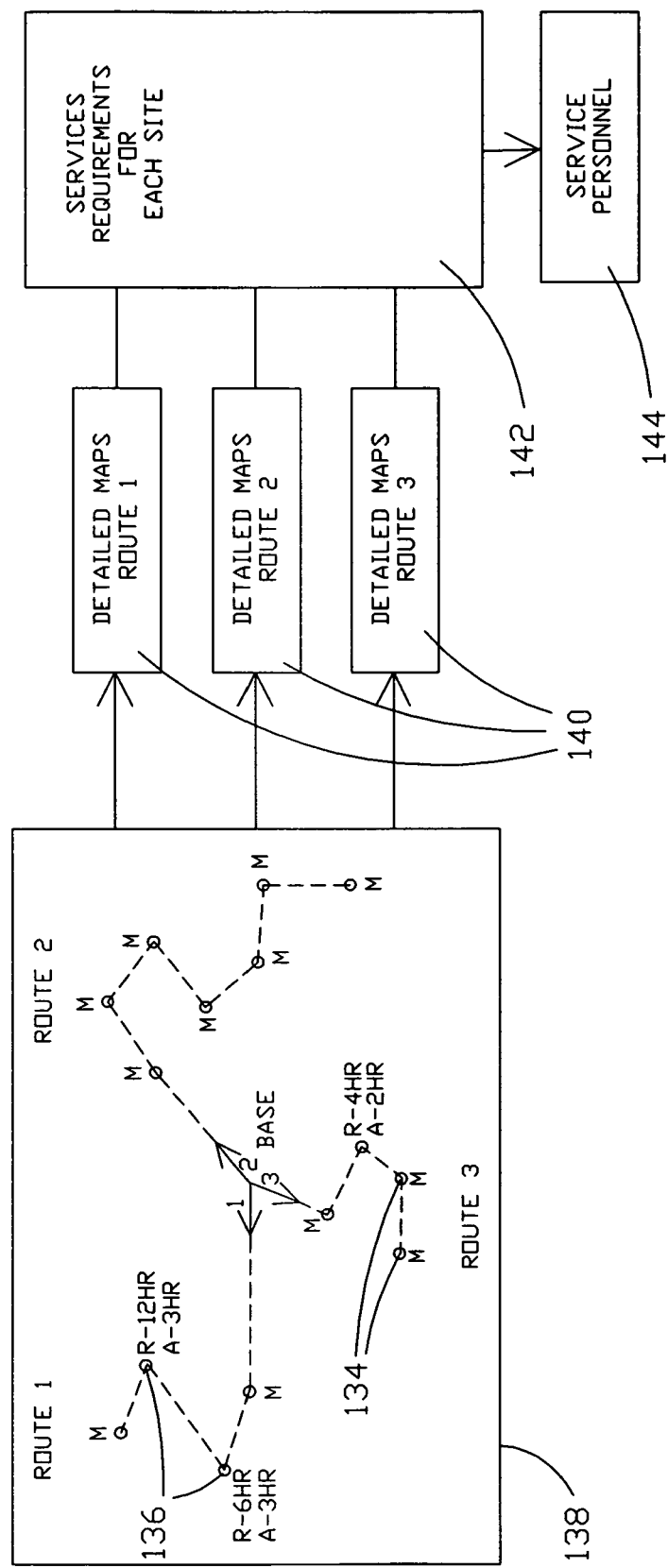
FIG. 6 is a schematic showing a process of computerized scheduling of service personnel in accord with one possible embodiment of the present invention.

Scheduler 132 may also be interactively utilized. For instance, as one possible example only, FIG. 6 shows interactive daily schedule screen 138 of sites for which work is due. Sites where maintenance is due are marked with an "M," a few of which are indicated by numeral 134. Sites where repairs are required are marked by "R" a few of which are indicated by numeral 136. Sites with repairs required are also shown with the remaining number of hours from the initial alarm in which the repairs are required to be made. If information is available, the anticipated time required on location for the repair is provided on the screen. Scheduler 132 may automatically draw route 1, route 2, route 3, and so forth, as indicated by the dotted lines. Alternatively, a supervisor may verify these routes or change them as desired or completely rework them. For instance, a supervisor may simply click on each site in a desired sequence to set up a route. Any site could be removed from that route by double clicking on the site.

Once the routes for the day are set up, then detailed maps can be automatically generated which give driving instructions, detailed maps for each site, and so forth, as indicated at 140. If the company utilizes GPS units for driving directions, then the locations of each site may be automatically or manually input into the associated GPS unit to provide driving instructions. As well, the required services, needs for special parts, and the like for each site may be provided as indicated at 142 and is given to the service personnel. Thus, the present invention provides a very convenient means for coordinating what needs to be done where, setting up a schedule for each service person, providing detailed driving instructions, and providing instructions as to what service is required for each site. The time and cost to service companies to do route scheduling without the present invention can be high. For this reason, the present invention is highly beneficial to the service companies.

Thus, in accord with the operation of the present invention, as discussed herein, a regulatory agency may set up an account having a password 102 to website 96 that enables the agency to view all accounts. If desired, only those accounts in noncompliance can be viewed and may be cataloged in various ways such as, for instance: alarm with no response, inspection not reported in a designated time period, or an account not actively in monitoring status. The present invention may verify compliance with standards such as the NSF International specification for third-party certification that requires that a wastewater treatment facility be repaired within 48 hours after an alarm. The present invention may also verify compliance with NSF International specifications that requires that a unit be inspected on a minimum semiannual basis. The present invention may also verify NSF International specifications requiring a service agreement to be renewed at least on an annual or biannual basis. Additionally, the regulatory agency is able to view the entity responsible for maintaining the equipment, the contact person, the telephone number, the equipment installed on location, and the history of all monitoring events. Should notification be necessary for noncompliance, a preprinted form may be downloaded from the website with the subscriber's information automatically inserted into the form for mail-out. The service company also benefits by the present invention in that a password-protected account is available showing all subscriber accounts due for maintenance, contract renewal, service personnel records for those embodiments where the particular service person is identified, and an all-events history for the equipment.

Figure 7:
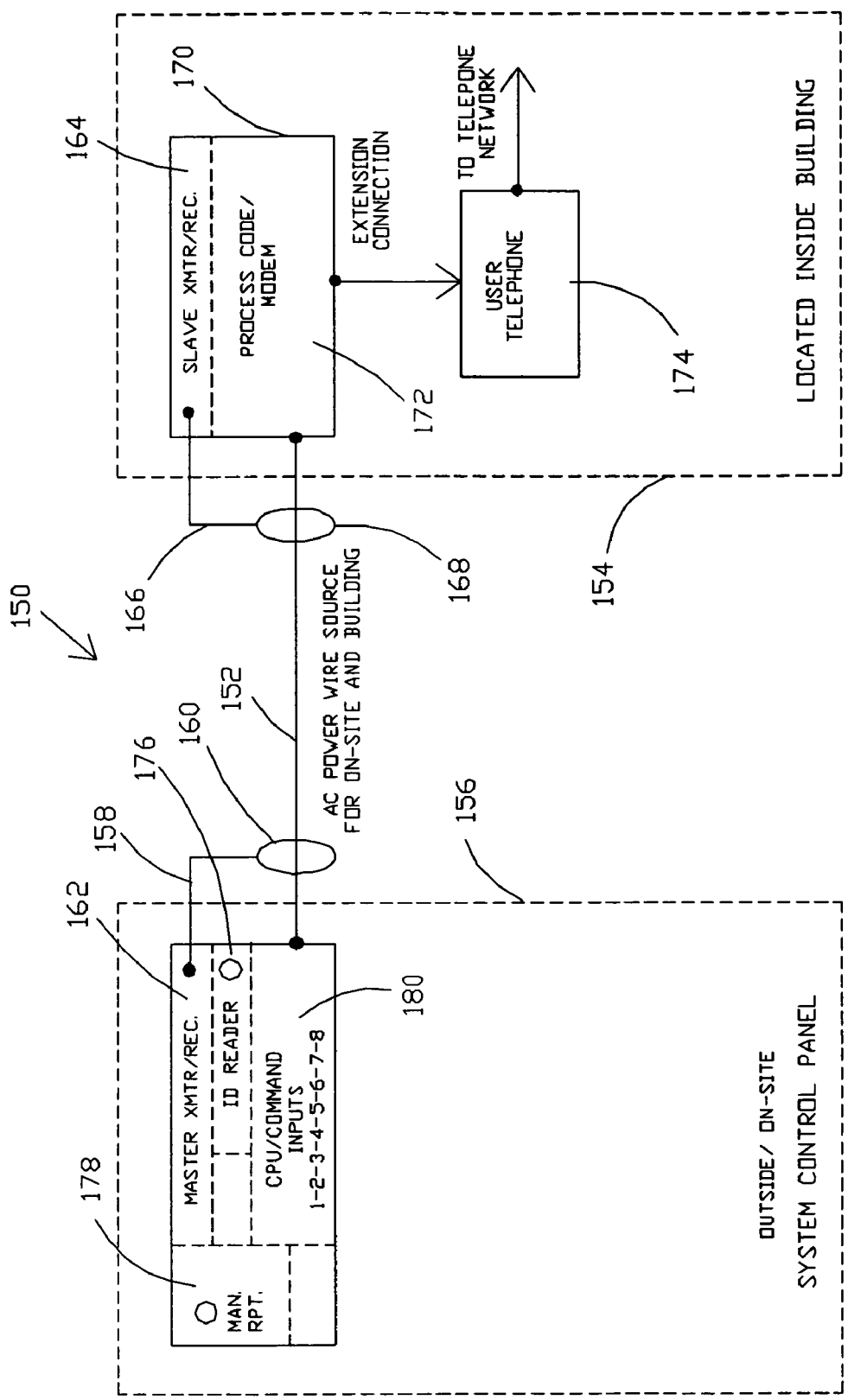
FIG. 7 is a schematic installation diagram for a two-way wastewater system master transceiver data link to slave telephone data modem, which may preferably utilize a previously existing phone subscription for connection to the data modem, and which preferably utilizes an electric motor power wiring data link to the environmental system in accord with one possible embodiment of the invention.

FIG. 7 shows one embodiment of a preferred two-way telephone/power line data transmission installation 150 which will typically require no additional telephone charges to the homeowner or other owner/operator of an environmental system, such as a wastewater treatment system. As well, two-way telephone/power line data transmission installation 150 may be built into a system within minutes by the system installer without the need for additional telephone wiring, thereby significantly reducing the time and cost of installing an environmental equipment system such as a wastewater treatment system, lift station, or water well. While a preferred embodiment of two-way telephone/power line data transmission installation 150 provides for two-way telephone data transmission as discussed below, one-way telephone data transmission as well as other or supplemental data transmission means may also be utilized.

In the embodiment of preferred two-way telephone data transmission installation 150 shown in FIG. 7, power line 152 has already been connected between building 154, such as, for example only, a homeowner's house and control panel 156 of a wastewater system. In certain systems, a power line is necessary for purposes of running a motor or other equipment at the installation. Power line 152 may be referred to, where appropriate, as a local short distance transmission link, because in at least one preferred embodiment power line 152 establishes a communication link that is generally less than one mile and typically much shorter such as less than one or two hundred yards and perhaps within a few yards of the homeowner's house. Power line 152 may also be referred to as a dedicated transmission link whereby the dedicated transmission link is only utilized for communication between master transmitter/receiver 162 and slave transmitter/receiver 164, which may hereinafter also be referred to as nodes. Control panel 156 may typically be positioned at or near the environmental system. Control panel 156 includes power line inductive loop data interface connection 160 which may act inductively to apply/receive data pulses to power line 152 from master transmitter/receiver 162 via master data connection line 158. As noted above, master transmitter/receiver 162 may be referred to as a node or as a communication node and/or a first communication node and/or master communication node, depending on the configuration, which is capable of sending digital data over a communication link to another communication node capable of forwarding the digital data to another location. In the configuration of FIG. 7, master transmitter/receiver 162 is not necessarily capable of receiving data from one or more other communication nodes and transmitting the data to one or more subsequent communication nodes, although in other embodiments of the present invention as discussed hereinafter master transmitter/receiver 162 may be operable for this function.

An inductive type of connection inherently provides a certain level of electrical isolation with respect to the master/slave transmitter due to the decreased inductive pick up at 60 Hz as compared to higher transmission signal rates and the ease of providing a notch 60 Hz filter. Other various filters or other means, e.g. optical coupling, may also be utilized, either in the alternative or in addition with inductive coupling, to supply/receive data to power line 152 in a manner whereby power line frequency is blocked from master transmitter receiver/transmitter. While the present system preferably utilizes two-way data transmission, for advantages such as polling to do diagnostics, queries, or checks on the environmental system from a remote user through a server or the like, the present invention could operate in a one-way data transmission mode.

Figure 8:
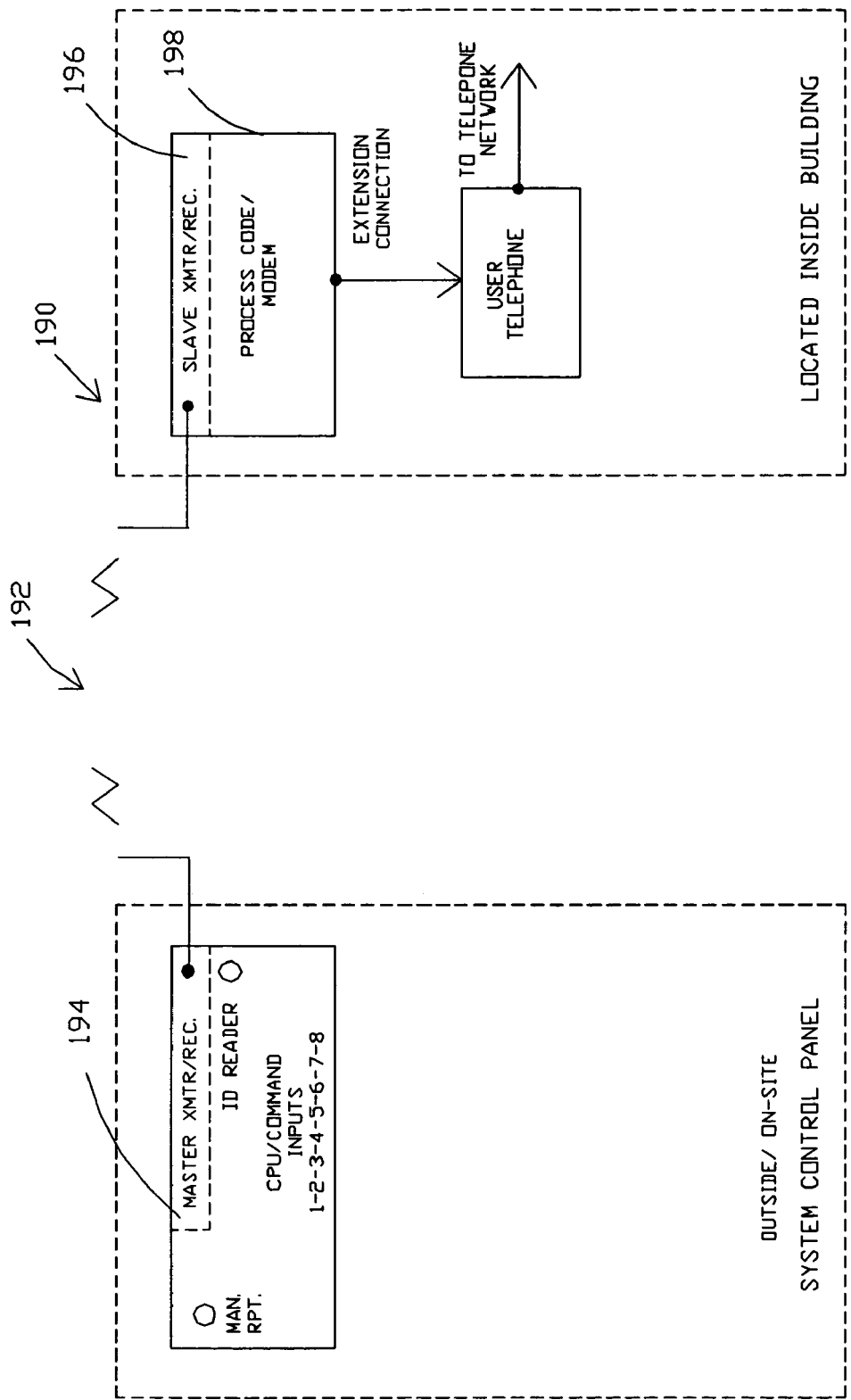
FIG. 8 is a schematic installation diagram for a two-way wastewater system master transceiver data link to slave telephone data modem, which may preferably utilize a previously existing phone subscription for connection to the data modem, and which preferably utilizes a cordless telephone transmitter/receiver link to the environmental system in accord with one possible embodiment of the invention.

In one possible embodiment of the invention using one-way data transmission, the operation of each (or selected of) master transmitters 162 of the system of FIG. 7 or each of master transmitters 194 of the system of FIG. 8 may be checked at desired intervals. For instance, if it is desired to verify or check that each or selected of a plurality of master transmitters 194 is operating properly on a monthly basis, then each (or selected) of the plurality of master transmitters 194 may be programmed to dial in monthly to verify operation of the communication system (and possibly also to provide a sensor status report because the call is being made anyway). The location to which calls are made, such as a central location, web site, or any suitable location, may be programmed to expect and to verify calls received and to classify any systems that do not call in as being out of service or temporarily out of service. This check, which might be called a heartbeat signal, may be performed at any desired interval such as daily, weekly, monthly, or the like. The heartbeat signal verifies that each communication system at each environmental equipment system is functioning properly or if not, then records this information for future action.

To reduce costs by eliminating unnecessary heartbeat signals, if a location is serviced, such as with a regular maintenance service, then that system may be programmed to wait for the full desired interval before sending a heartbeat signal to avoid unnecessarily checking in.

When the service personnel are at the location, and are detected by the personnel detector as being at the location, then the system may, if desired, be programmed to automatically send data to thereby indicate service personnel are present, and also to provide a confirmation signal, light, sound, or the like for the service person so that the service person knows the communication system is working, and also knows that his presence was detected and communicated. In this way, service personnel cannot later say they were at the location but the communication system, personnel detector, or the like failed to note their presence and they were not aware of any communication system problems. A response or response(s) to the confirmation signal by the service personnel may also be required to verify the service personnel properly heard, saw, or otherwise was made aware of the confirmation signal.

If desired, automatic two-way operation from a programmed dialer at the central location, website, or the like may be utilized for troubleshooting purposes. For instance, each system not calling in could be called to check that at least the phone line is operating. In case a human answers the phone, an automatic message could be programmed to say that a problem may exist with the system communication system, to please hang up and not answer if another automatic call is made within the next minute to try to communicate with the system. At this point, the system would at least know the phone connection is operating, and perhaps might be able to reestablish communication with the system. Automatic troubleshooting could thereby eliminate some of the problems. Thus, the present invention provides the ability to verify the communication system is operating utilizing either one-way operation, two-way operation, or both. If no communication can be established within a selected time period, then the service company, customer, regulatory agency, or the like, can be automatically notified of the problem by any or several selected preferably automated means including post, email, automatic phone messaging, and the like. Progress to resolve the problem can be monitored and recorded by the system until the problem is resolved.

In the embodiment of FIG. 7, slave transmitter/receiver 164 connects via slave data connect line 166 and inductive loop 168 to power line 152. Slave transmitter/receiver 164 is preferably mounted in conveniently mountable building package 170 along with code processor/modem 173. As discussed hereinafter, conveniently mountable building package 170 may simply be inserted in a power socket in a customer's house to provide a quick, low-cost installation. For convenience of terminology, slave transmitter/receiver 164 may be referred to as a node or as a communication node and/or a standard communication node and/or a second communication node and/or as a slave or master communication node depending on the configuration, which is capable of receiving digital data and then forwarding the digital information to a different location, such as a remote location, over a different communication link such as a telephone network which may connect to a wide area network such as the Internet. Building package 170 may be mounted by connecting to any power socket and to any telephone jack of a house to establish a communication link between power line 152 and user telephone 174. Thus, the set up of a data communication link between the environmental system, e.g., a home wastewater system, and the Internet may be set up in minutes. By using existing phone service 174, extra phone service subscriptions are not required thereby reducing operation costs.

Master transmitter/receiver 162 may be under control of CPU 180 and programmed to generally initiate communication with slave transmitter/receiver for connection with the Internet or other desired data path to a desired location, e.g., website 18 discussed hereinbefore. Thus, after acquiring data to be transmitted, or perhaps at predetermined times so as to verify the existence of a working communications link, master transmitter/receiver 162 may be programmed to send a data package to slave transmitter/receiver 164. Slave transmitter/receiver 164 then activates modem 172 which connects to user telephone line 174 for communication with a wide area network such as the Internet or the like. The data communications link between slave transmitter/receiver 164 and servers or the like at website 18 or other locations may be referred to herein, where appropriate, as a long distance communication link which may be easily capable of sending data hundreds or perhaps thousands of miles from slave transmitter/receiver 164 and may be located virtually anywhere worldwide with a connection to the Internet perhaps through the telephone network.

If desired, processor code/modem 172 may be programmed to receive service calls but not regular customer calls using, for instance, instance, distinctive ring services which are often available as a standard feature of telephone subscription packages. In this way, master transmitter/receiver 162 may be contacted remotely, such as by service personnel or a service diagnostic computer (not shown), located a long distance from installation 150 to thereby save service transportation costs where remote servicing is possible. Any other suitable means such as a customer switch, or other signal detection means, may also be utilized to permit diagnostics and/or sensor checking from remotely based service personnel. Once the modem is activated such as by receiving a telephone call, then slave transmitter/receiver 172 receives the signal and notifies master transmitter/receiver 162 and/or transmits data thereto, whereupon control panel 156 then operates in accord with programming of master CPU 180. Thus, master CPU 180, and slave processor/mode, and possibly master/slave transmitter 162, may each be separately programmed to coordinate operations thereof.

In some locations, such as remote locations or locations without telephone service, or if otherwise desired, other types of data links may be established. For instance, package 170 may provide a computer port connection to an installation customer's or user's computer to thereby be operable to connect to the Internet through a cable or satellite link to the Internet. If desired, software may be included that provides messages and so forth to the user related to operation/status of communications by package 170. As another possible alternative, antennas, dishes, and the like may be mounted to panel 156 to connect via any signal paths, some possible examples of which are discussed hereinafter.

To the extent the power utility company provides Internet access over the power line, the link to building 154 may be eliminated, if desired, to provide a direct link to the Internet. However, where necessary to reduce costs to a minimum, it may be desirable to provide a master/slave link even in this scenario to avoid any additional Internet subscription costs.

In another embodiment, the present invention contemplates cellular telephone connections and the possibility of programming the cellular telephone to use an existing cellular account where possible to save costs. It is a general purpose of the invention to provide low cost, quick and convenient installation as well as long term low cost operating service for the communications link. The embodiments described herein provide that result in a manner that as of this day are less expensive than cellular telephone although the present invention does not rule out the possible use of a cellular and/or pager connection especially if the costs are kept low. For instance, due to the large number of systems, and the typically very low data transmission usage, specialized cellular telephone contracts might be obtained which result in lower costs. To keep costs low, a typical system may only communicate at service calls and/or maintenance request calls and/or system checks as may take typically require less than one minute.

Other features of control panel 156 may include various options such as ID reader 176 whereby a serviceman may have a magnetic strip card or bar code as discussed hereinbefore which is read by the ID reader 176 to provide additional information as to the identity of the serviceman, time of service, duration of service, as discussed hereinbefore. If desired, a manual reporting means, such as a button or keypad as discussed hereinbefore, may also be utilized so that a report may be sent from control panel 156 to the Internet or other desired data link as desired. CPU/Command input portion 180 may comprise a programmed computer with various interface inputs as desired for various sensors, testing, initiating data communication, and so forth. Sensor inputs may include operational data such as motor currents, speed, temperature, pH, chemical properties, service personnel detectors, and/or any other type of electronically detectable signals some of which may also be discussed hereinbefore or after.

While a power line communication link is shown in FIG. 7, any type of suitable conductor of communication signals might be utilized to provide a suitable communication link preferably without the need to additional wiring that is not also required for other operational purposes, e.g., metallic pipes, conduits, and so forth.

FIG. 8 provides another possible embodiment of the present invention whereby two-way short distance radio wave link data transmission installation 190 is utilized but which is otherwise similar to system. In one preferred embodiment, a cordless type telephone link may be provided, e.g., a standard 900 MHz, or 2.5 GHz, or spread spectrum, or other types of cordless telephone communication links may be utilized to establish a cordless data communication link 192 between master cordless transceiver 194 and slave cordless transceiver 196. Generally, the FCC or other regulatory agency designates particular frequency bandwidths for use as cordless phone, Wi-fi, other short distance communication links. Thus, a cordless phone for purposes of the present invention may preferably utilize frequencies designated by governmental agencies for short distance transmission and may generally comprise non-broadcast type radio wave equipment, e.g., relatively low power equipment. CB transmissions or walkie talkie transmission permit communications at distances from zero to hundred miles but are generally not regulated as broadcast radio in the sense that a license must be obtained, are readily commercially available, and typically provide for less than about 5 watts of broadcast power. Generally, preferred wireless systems in accord with the present invention would not produce undesirable emf interference. Existing cordless phone circuitry is preferred due to the low cost, easy availability, and compatibility with phone systems.

In this embodiment, module 198 is simply connected to a phone line plug which in many houses is often already provided for extension phones, thereby greatly simplifying installation. Module 198 may receive power from the phone line and charge a battery for operation of slave transmitter/receiver 196 or may also include a power cord for connection to a power line. For convenience of terminology, slave transmitter/receiver 196 may be referred to as a node or as a communication node and/or a first communication node and/or as a master communication node, depending on the configuration, which is capable of sending digital data over a communication link to another communication node capable of forwarding the digital data to another location. It will be understood that module 198 may be provided in separate modules such as a base unit and signal amplifier transponder unit (not shown) to improve signal transmission over data link 192. Power for master transmitter/receiver is generally available either by a power line for a motor, by solar power and battery, and/or other suitable means. As discussed hereinbefore with respect to system 150, slave processor/modem 198 may connect to the Internet or to any data link using the telephone network as desired.

In the configuration of FIG. 8, master transmitter/receiver 194 is not necessarily capable of receiving data from another communication node and transmitting the data to one or more subsequent communication nodes, although in other embodiments master transmitter/receiver 194 may be operable for this function as discussed hereinafter.

In another embodiment of system 190 shown in FIG. 8, or as discussed below in conjunction with FIG. 9, walkie-talkie communication links may be utilized with commercially available transceivers, e.g, 130-138 Mhz, 225-238 Mhz, 113-117 Mhz, 144-149 Mhz, and/or others, which may typically provide a range of 1 to 50 miles between a slave transmitter/receiver and one or more environmental systems. Generally, the FCC or other regulatory agency assigns bandwidths for these types of communication devices although any suitable and permitted frequencies may be utilized in accord with the present invention. While one possible presently preferred embodiment provides a single data link between a single environmental system to a single local building, it will be understood that the present invention is not limited to this particular communication system architecture and that one or more walkie-talkie communication nodes, or other wireless communication nodes, may be established that operate in a wide range of possible communication topographies some of which are discussed herein.

While a preferred inexpensive and easily mountable relatively short distance master/slave data link between the environmental system and a local building has been described, other wireless data links from an environmental system to a proximate building may also comprise ultrasonic links, LED links, optical links, spread spectrum audio links, vibration transmitters, electromagnetic waves, and many other suitable data transmission links. If desired, combinations of different types of data transmission links may be utilized to provide additional reliability based on cost/benefit for these links as desired.

In another embodiment, data links such as two-way pager data-only transmission links may be utilized which may provide less expensive communication links than cellular telephones. In a preferred embodiment communication costs are kept very low although other types of data links may be utilized as developed or known or based on reduced prices which may occur for those services in the future. Thus, wireless data communication links to the Internet or to other data links may comprise satellite, blimp mounted transmitter/receivers, radio wave transmitters and/or receivers, cellular towers, and the like. These devices may utilize any convenient modulation, e.g. spread spectrum. In many cases, it may be possible to utilize rather slow data transmission rates to save costs because communication from any particular environmental location may require infrequent communications of small amounts of information.

The systems of FIG. 7 and FIG. 8 operate to provide a quick and inexpensive means for providing communications to an environmental equipment system. The system of FIG. 8 may be especially suitable for environmental systems that do not require motors or the like that would require power lines. In this case, master transmitter/receiver 194 and the related sensors and CPU may utilize solar power/batteries, and low power drain circuitry.

Figure 9:
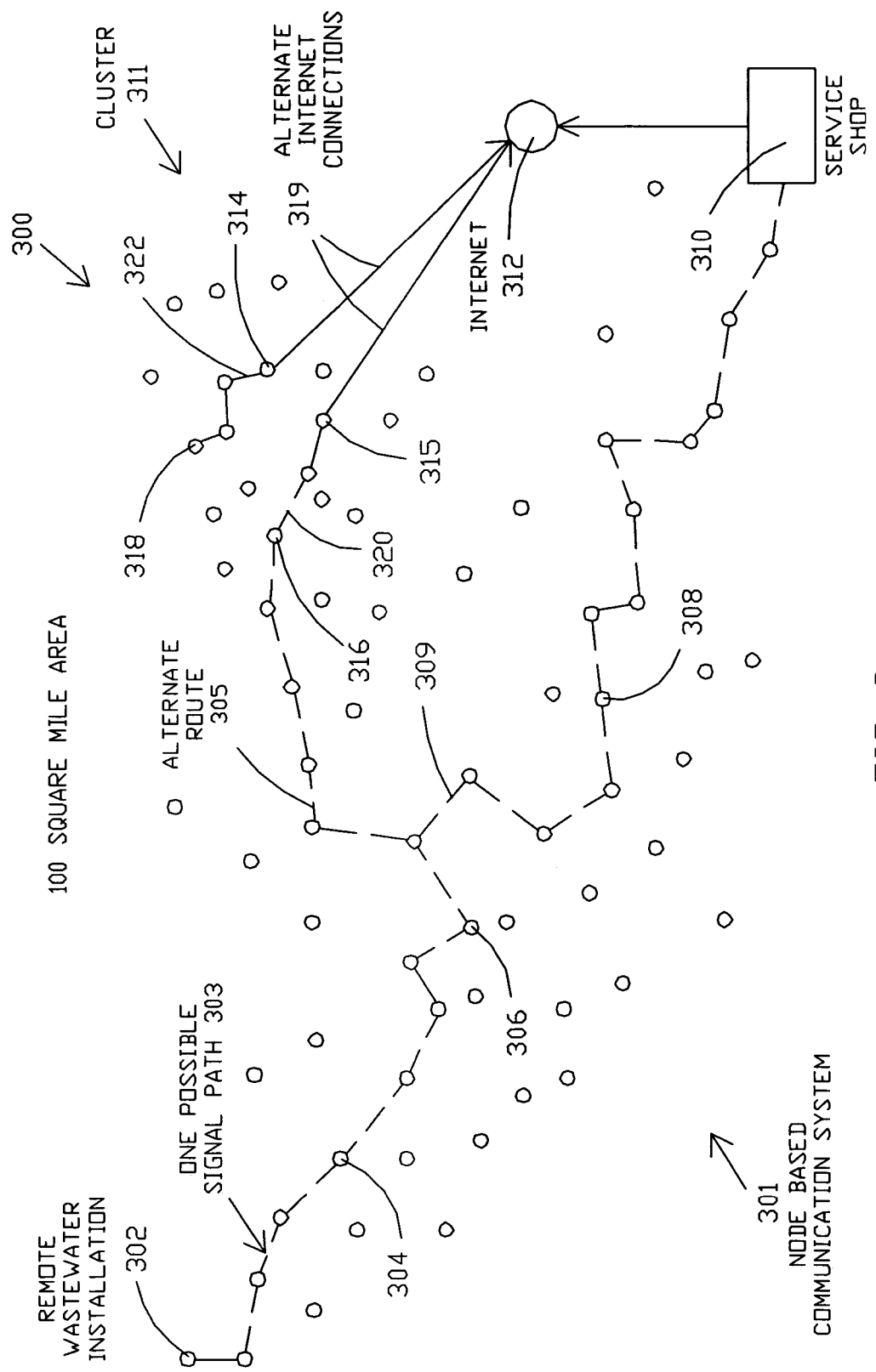
FIG. 9 is a schematic installation diagram for a two-way wastewater system with multiple wireless transceivers whereby a communication path to the Internet through a repeater pathway which comprises the multiple wireless transceivers in accord with one possible embodiment of the invention.

FIG. 9 provides yet another possible embodiment of the present invention. In FIG. 9, an example of a node-based communication system 300 in a 100 square mile area is shown wherein each node, which may be associated with an environmental equipments system such as a wastewater processing system, is within one to ten miles of each other to thereby permit the use of low-cost wireless communications such as, for example only, inexpensive readily available walkie-talkie type transceivers at each node. Each node, such as nodes 302, 304, 306, 308, and the like, has an identical transceiver, e.g. a walkie-talkie, and may also utilize identical programming to thereby reduce costs. Each node will preferably store information specific to that node such as location, data history, alarms, schedules, installation dated, serial numbers, modifications, repairs, and the like as desired. Each node may be programmed for either automatically transferring information from other nodes or for storing information to be transmitted until a desired time. A node communication architecture as shown in FIG. 9 may be cost effective due to elimination of the separate modules required in each house such as module 170, and by eliminating even the few minutes required to install module 170. System 300 does not require that the homeowner be at home and/or that access to a local building be provided, to initially set up the short distance communication link. This architecture may also eliminate or substantially reduce the need for phone dialers, modems, and the like.

In this example of a node-based communication system 300, which might be used for a plurality of wastewater systems for example, a walkie-talkie type transceiver node 302 may be utilized at each wastewater station. To communicate from node 302 to the Internet, a node-to-node communication link is formed that sends a signal to an Internet access point. For instance, service shop 310 or a master nodes 314 or 315, may be have access to the Internet. Accordingly, node 302 may communicate with nodes along a somewhat arbitrary strongest signal and/or automatically predetermined node path 303. Node path 303 might include, for instance, nodes such as 304, to 306, to 308, and so forth, such that in the node-to-node communication link each node acts as a signal repeater to transmit the signal from a previous node in the path to the next node until the signal reaches to service shop 310, master node 314, or other Internet access point. As indicated above, node-to-node route 303 may be predetermined and stored in the memory of each node for each node. As an example, after receipt of a signal or perhaps as a once a day update, service shop 310 then connects to Internet 312 to send in the data received that day. If a rush signal were obtained, then the connection might be made immediately.

In a preferred embodiment, each node may be programmed to communicate with other nodes, and may be programmed automatically set up a communication node-to-node link for each node based on the strongest signal channel available at the particular moment so that arbitrary node path 303 would automatically adjust to and provide the strongest signal path data link to service shop 310. If a node was in the group of nodes and communication was lost, e.g., due to a storm, then the other nodes would detect the absence of a scheduled ping or acknowledgment signal whereby service shop 310 would be notified of a communication breakdown at the particular node or nodes of concern. The same type of occasional ping or acknowledgment signal may be used in the systems of FIG. 7 and FIG. 8 to provide information of a communication breakdown. The node-to-node communication scheme provides two-way communication that does not require a user with a telephone connection, or that a telephone ring in order to receive communications, to the extent that might be of benefit.

Each node may or may not be identically programmed and/or may be operable in different programming modes which may be selected as desired. For instance, the nodes may be collectively programmed to detect the strongest overall signal path for each node and to store that signal path. Alternatively, each node may accept a predetermined manually selected signal path as determined by an operator or a computer such as at wastewater installation service shop 310. Alternatively, the nodes may be programmed to select a new path at selected intervals for each node and store the same in memory for use as needed, e.g., every two-day interval the best signal path is determined and reported to service shop 310, if desired.

As an example, by starting with the closest installation to the service shop or other master node, e.g., node 315, then the adjacent nodes in communication are determined and their signal strength is determined. Then those nodes check for the adjacent nodes and signal strength. This process goes back through the entire node network system 300. If a previous system is already in memory, then a check is made that all nodes are present and if not, attempts are made to contact any missing node utilizing the nodes adjacent thereto. With all nodes accounted for, a best signal path is developed whereby each node preferably utilizes a maximum signal strength node-to-node connection as the primary send/receive node for normal transmission of signals. Communication from any node then normally proceeds utilizing the primary node path whereby a system of signal paths is established back to one or more master nodes, e.g. shop 310 or nodes 314 or 315 which have Internet access or other communication access. If communication is disrupted so that the primary send/receive node does not respond, then a node may communicate with any node and request a check of the listed primary send/receive node. The optimal signal path may be stored in a computer memory at each node, such as within control panel 156 of FIG. 7.

As well, each node may be provided with identical transmitter/receiver with approximately the same transmission range whereby the mass production permits a relatively long distance e.g. 10-15 mile range between nodes at a relatively low cost. Each node-to-node link may be referred to where appropriate as a medium distance link which is typically in the range of several hundred to several miles but could be up to one hundred miles or so. Note that range of sight transmissions may not be possible directly between some nodes due to hills and the like but that a connection may be possible through other nodes. For maximum data transmission rates, preferably each node will be able to send and receive simultaneously. However, by providing send/receive signals at irregular intervals for each node, or by synchronization signals, then one-way signal transmission techniques may be utilized to provide reliable communication at a lower cost because in a typical system the data flow rate is relatively low.

If desired, some nodes may utilize less expensive walkie-talkie type transceivers for the distance involved, e.g., a two-mile range walkie-talkie for closely spaced together wastewater installations. However, the current price of a ten-mile walkie-talkie is relatively low, especially in large orders, and may cost a few dollars each. In a node-to-node communications scheme, the cost of the telephone/cable modem may be substantially eliminated. It will be noted that although fifty-mile range walkie-talkies are available, these tend to be more expensive but may be greatly reduced in price by use of mass production for a single project that require only data transmission and no voice transmission.

If desired, a combination of the systems of FIG. 7, FIG. 8, and FIG. 9 may be utilized based upon cost and/or remoteness from another node. For instance, consider node cluster 311, whereby a group of nodes are relatively isolated from the majority of nodes. In this case, one or more of the relatively local walkie talkie nodes may be established as a connection link, utilizing the system of FIG. 7 or FIG. 8, to connect to the Internet. In this example, master nodes 314 and 315 each have an Internet link 319. The remainder of the nodes can communicate with each other and to master nodes 314 and 315., e.g., 315, 316, 318, 320, 322, may be set up within, for instance, a 10 mile area, to communicate with a plurality of environmental systems. For this example, the node cluster 311 would provide a relatively short distance communication link (up to approximately 5-10 miles or so utilizing inexpensive transmitters) with a plurality of environmental systems, and interconnect the plurality of environmental system to website 18 discussed hereinbefore or to any desired server or the like. Master nodes, such as nodes 314 and 315, may also be utilized to provide redundant communication paths to Internet 312 in case Internet communications or other communications are lost at any particular Internet access point.

As another example, cluster 311 may link to node-to-node system 310 through alternate route 305. As another example, clusters of nodes may such as multiple clusters 311 may be interconnected. Master nodes may also comprise satellite communication links, blimp communication links, and the like to service very remotely located locations where power and telephone connections are not available. Accordingly, it will be appreciated that many variations of communication topographies in node communication systems may be effected either automatically or manually.

As another benefit, it will be noted that node communication system 301 effectively creates an independent communication network that may be utilized, and rented out, for other purposes. Such a node system interconnected with other node systems may become very large, e.g., hundreds of square miles, and form a network of fixed position computers as might be useful for many purposes such as collecting data. For instance, the master computer, e.g., master computer 180 shown in FIG. 7 and FIG. 8, may be programmed to interface with modules built by customers/suppliers of a large node system. As an example, environmental sensors in a solar-powered walkie talkie node could monitor the local streams and/or rivers within the node network and communicate with environmental equipment system nodes to the environmental agency. In this way, it would be possible to monitor and detect pollutants over wide areas, at many remote points, to thereby pinpoint possible sources of pollution at a very early stage. In another embodiment, the website 18 discussed hereinbefore may be utilized to directly enter lab testing results of samples and/or to receive the collected environmental sensor data whereby the environmental agency will have immediate access. Where appropriate, the data may be displayed on maps or in other ways which enhance the value of the data.

As another example of use for purposes unrelated to environmental installations, a standard weather package may be connected to the node network to obtain many readings over hundreds of square miles such as air temperature, humidity, pressure, ground temperature, rain levels, wind rates, and so forth to thereby provide a valuable service which farmers, television stations, and the like, may pay for in order to provide more accurate information than competitors. Such a system might also be useful for collecting data related to tornado tracking/warning due to the ability to network desired sensors to fixed locations over a wide area.

Another use of the so created communication network may be for location information of service personnel as might be useful for wastewater maintenance service companies. For instance, a transponder positioned on the service personnel truck would provide automatic location and route tracking of the truck as each node detects the presence thereof. The arrival time, time on location, departure time, service truck numbers, and so forth, could be automatically recorded by the node as another embodiment of a system that does not require single purpose, separate and permanently mounted personnel detector as mentioned hereinbefore. If a service truck drops off service personnel at various locations, then each service personnel could be appraised of the location of the service truck as may be useful.

Another use might be to activate equipment such as irrigation equipment, anti-mosquito fogging equipment, spraying equipment, farm related equipment, and so forth.

Another use may be for animal or people tracking using infrared sensors/movement sensors. Other data may also be transmitted through the node to node network, e.g., email, and the like. Accordingly, it will be understood that the present invention may be utilized for purposes related or unrelated to environmental systems.

Another use might be the creation of a wide range Wi-Fi Internet access network for relatively remote areas. Note that the homeowner may receive an email of a system alarm or a reminder of low chlorine levels, or the need for other chemicals, or the like utilizing the present system.

In another embodiment of the invention, rather than manufacture node system 300, a pre-existing coast-to-coast walkie talkie phone service with custom equipment design may be available at a relatively overall low cost blanket manufacturing/subscription rate from an OEM provider, assuming very large numbers of nodes would be utilized for establishing node networks.

However although specific examples are discussed immediately above, e.g. walkie-talkies, it will be understood that a local node system may utilize any suitable transmission means as is available which may provide a suitable cost/benefit and/or transmission distance available as current or future technology permits. Specialized communication nodes may also be utilized. For instance, once designed and programmed, relatively low-cost specialized, highly reliable, data communication systems may also be provided which may operate using, for instance, spread spectrum transmission, which may take advantage of the relatively low speed data rate communication links required to support wastewater system monitoring, and which operate with slow data rates but with highly reliable data communications links between the nodes at longer distances, e.g., even 100 miles or so whereby even very weak signals transmit slowly but very accurately and reliably.

In another embodiment, each environmental system such as a wastewater system would comprise a two-way walkie talkie node capable of communicating with any other node within 50 miles. Thus, a network of linked nodes could be set up whereby a communication could cover hundreds of miles so long as any particular wastewater system was within 50 miles of another node. Due to the need to provide only a commercially available, substantially low cost walkie talkie transceiver at each wastewater installation, and no other equipment except a node such as the service shop where Internet access is available, the costs may be even further reduced.

In accord with one embodiment of communication system, no external required phone line communication need be installed. In one possible embodiment, the system may comprise an FM transceiver master controller module that is located at the main control panel. The master controller communicates with a secondary or slave FM transceiver that is located in a residence or facility which preferably has an internal phone line extension, or a dedicated line to thereby communicate system status to a central monitoring station and/or website 18. In another embodiment an FM transceiver signal is sent by injecting the signal onto the ac wiring of a house. The master control sends the data to a secondary slave which is located in the house and may conveniently be plugged into an ac outlet. The house or facility preferably has an internal phone line extension, or a dedicated line to thereby communicate system status to a central monitoring station and/or website 18.

Although a particular compliance system organization has been described, other computerized compliance system organizations could be used. For instance, each service personnel could have a handheld computer that communicates data to a desired location. Computer interconnections between the handheld computer and controller 12 could be made either by cable or wirelessly. The inspection data and details of repair may then be transferred by the handheld computer. Thus, the system may be set up quite differently and still effect the same functions and purposes. Each service company might set up a system that communicates between the service personnel, the unit, and a centralized data collection center whereby the data is available from all sources to the regulatory agency.

Figure 10:
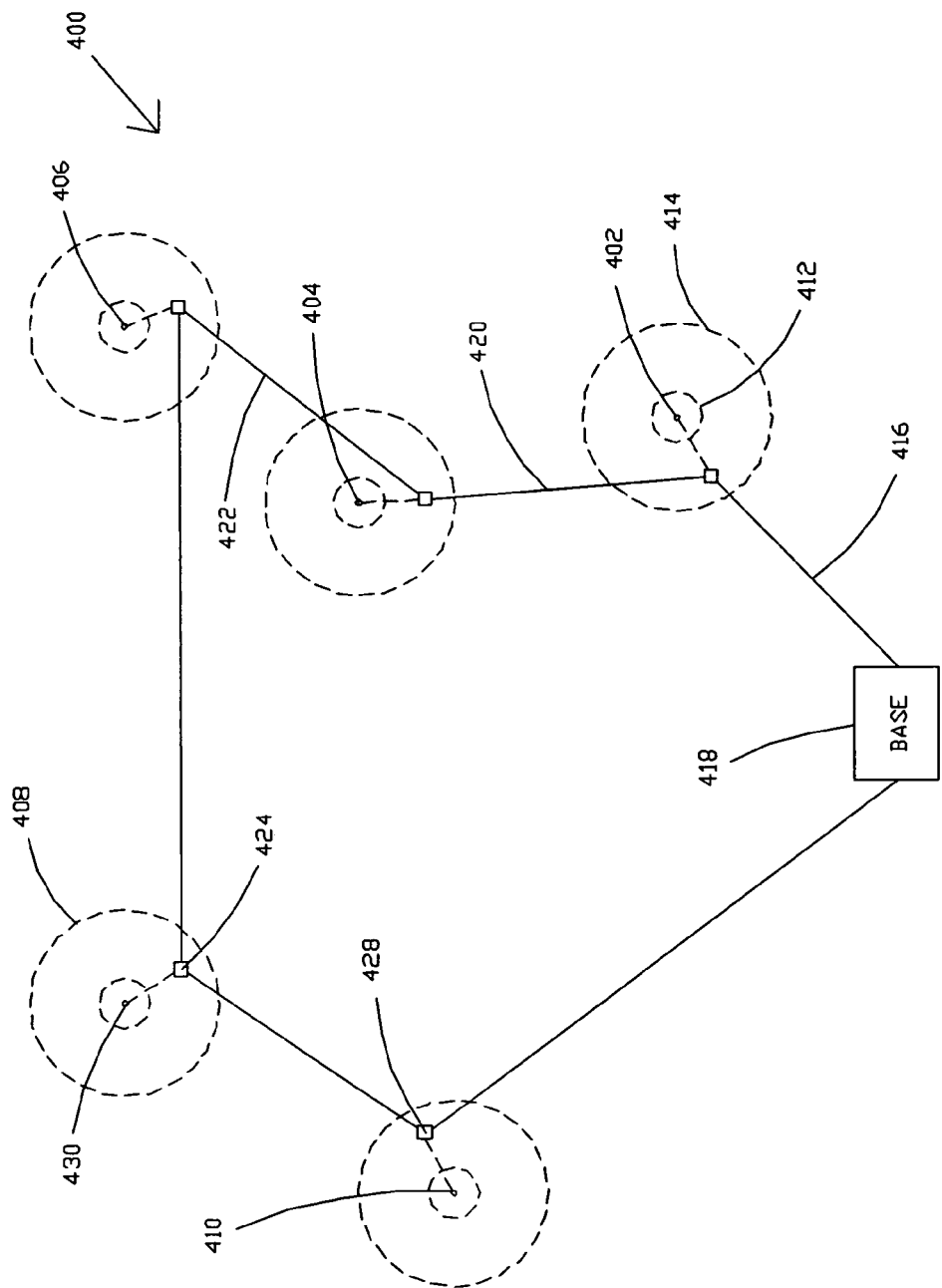
FIG. 10 is a schematic showing a plurality of environmental equipment installations with at least one service personnel detection zone encircling each one in accord with one possible embodiment of the present invention.

FIG. 10 is a schematic for a personnel detection system 400 in accord with one possible embodiment of the present invention indicating a plurality of environmental equipments systems such as systems 402, 404, 406, 408, and 410. In this example, each system is surrounded by a service personnel detection zone which may be of different sizes, shapes, and relative positions with respect to the systems. For instance, the service personnel detection zones might be 20 yards in diameter or larger, e.g., a hundred or few hundred yards. Generally, the zones are set electronically by wireless means and may be configured in a desired size and shape. Moreover, there may be several detection regions. For example, system 402 may utilize a smaller service personnel detection region 412, or a larger service personnel detection region 414, or both. In the example shown in FIG. 10 with respect to system 402, for example, two service personnel detection regions surround system 402. Instead of having system 402 at the center, one or both detection regions could be adjacent or somewhat off to the side. It will be understood that this is only an example and that one service personnel detection zone may be used for each system, such as system 402, but that others may also be used.

Figure 11:
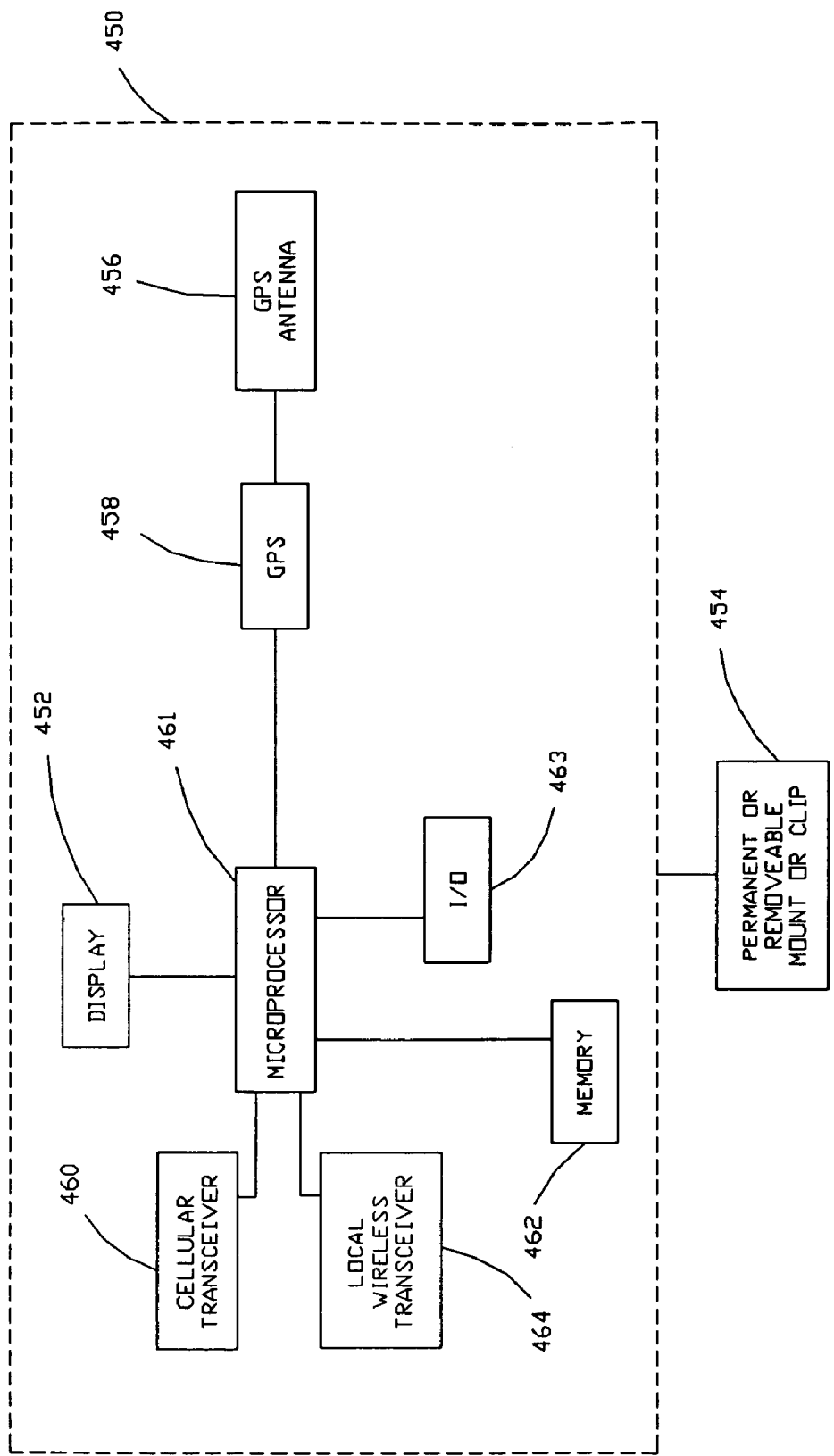
FIG. 11 is a block diagram showing one possible embodiment of a portable GPS device which may be utilized to produce data related to entry of service personnel into the service personnel detection zones of FIG. 10 in accord with one possible embodiment of the present invention.
Figure 12:
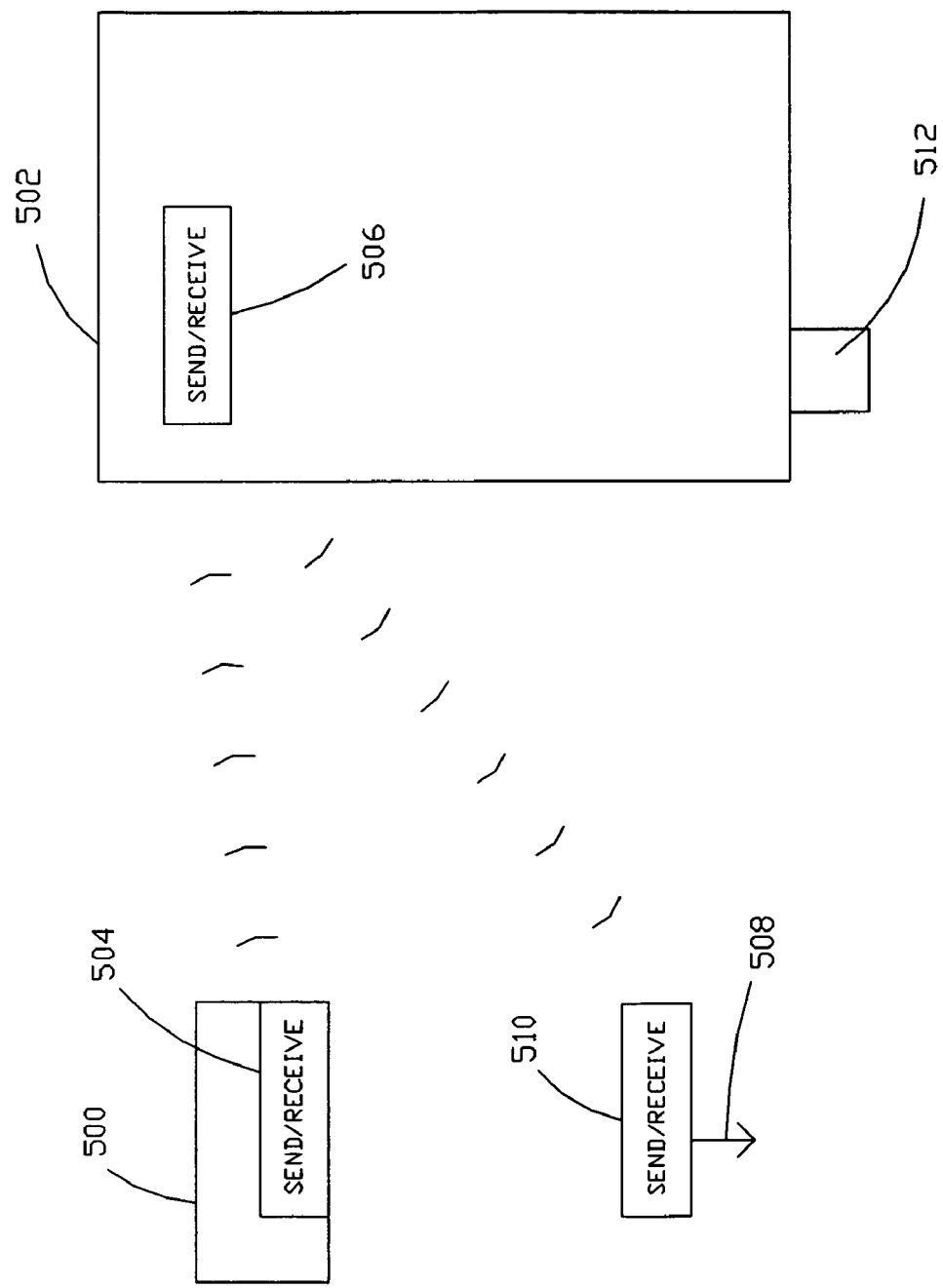
FIG. 12 is a schematic diagram showing one possible embodiment of a portable wireless device for use with cordless telephone circuitry which may be utilized to produce data related to entry of service personnel into the service personnel detection zones of FIG. 10 in accord with one possible embodiment of the present invention.

In one preferred embodiment, the service personnel detection regions are defined wirelessly by suitable electronics. For instance, FIG. 11 shows GPS locator 450 which may utilize programming related to GPS signals to define a geophysical region such as service personnel detection regions 412 or 414 or both. FIG. 12 shows personnel locator 500 which may utilize cordless telephone technology to contact monitoring electronics 502 which monitors the environmental equipment system as described hereinbefore. In this case, the transmission range of the cordless telephone electronics wirelessly defines service personnel detection regions 412 or 414. In another example, in FIG. 13, a camera such as camera 550, which may be an inexpensive CCD device, may be utilized to provide a wireless personnel detection region and may also be utilized for visually monitoring environmental equipment 552. In this case, the camera visual range and orientation wirelessly defines the service personnel detection zone. The above and or other electronic service personnel detection devices may be used by themselves or in combination. As well, various communication means may be utilized in conjunction with these systems for communicating the electronic detection of the service personnel to a database such as web server 26 of FIG. 2.

In FIG. 10, a service truck may travel along a service route to all of the sites which require service for that day, leaving from and returning to base 418. The route may have legs between each stop, such as leg 416, 420, 422, and so forth, which establish the route.

FIG. 11 shows one possible GPS locator 450 which may, in one possible embodiment, be mountable on a truck dashboard or windshield, such as with a suction cup 454 and a power connection to a cigarette lighter receptacle, for charging and perhaps for viewing on display 452 of a road map showing the route for the day, such as the route shown in FIG. 10. Upon reaching a location in a truck, and parking the truck, such as at parking spaces 424, 428, or the like, locator 450 may be carried by the service personnel to the environmental equipment system through a respective personnel detection zone. Alternatively, the personnel detection zone may be large enough to encompass the parking space for the truck so that it is not necessary to remove GPS locator 450 from the truck. Or both zones may be required to show the service personnel has been detected depending on the programming. For instance, parking space 424 is within service personnel detection zone 430 but not within smaller personnel detection zone 408. In any case, GPS antenna 456 and GPS 458 will show the geophysical position of the service personnel as he moves to environmental equipment system 408 as being within the service personnel detection zones 430 and 408.

There are numerous options for communicating GPS information or service personnel detection information to servers or the like using communication systems discussed hereinbefore to provide a record of when the service personnel arrived and/or how long he/she was on location. For instance, upon leaving, the service personnel might utilize cellular phone circuitry 460, if this component of device 450 is available, by pressing a button to send information that provides an accumulation of time and location data which will show when the service personnel arrived, how long the service personnel stayed, the service personnel ID, when the service personnel departed, and any other desired information. Microprocessor memory 462 may also contain the location of the service personnel detection zone and microprocessor 461 may be programmed to utilize cellular electronics 460 to send the time of arrival and departure without need of the service personnel to press a button, and may save the information as a backup in case the cellular line did not make a good connection. As well, if the option is available, either manually or under microprocessor control, service personnel detection information might be sent via local cordless phone circuitry, or by walkie talkie utilizing local wireless electronics 464. GPS locator 450 may also comprise I/O 463 that may be physically connected to a socket in the electronics of dialer 12 (See FIG. 1) at the environmental equipment system, or a computer, or the like at base 418 (See FIG. 10) in order to communicate the presence of the service personnel to a storage unit such as web server 26. GPS locator 450 may also comprise an electronic means for describing the services made, the costs, and so forth which may also be downloaded at base 418, or which could be transmitted as discussed above. Accordingly, service personal detection information such as arrival and departure times from location, and perhaps other information, may be transferred to server 25 (See FIG. 2) or the like.

GPS locator 450 need not comprise all of the above described components, some of which are redundant. For instance, in another embodiment shown in FIG. 12, ID device 500 may comprise cordless phone circuitry such as send/receive integrated circuit 504 or other cordless phone circuitry for wirelessly connecting to dialer 502. Thus, a send/receive integrated circuit is not required, but may be an inexpensive means for implementing the device. Dialer 502 may also comprise send/receive integrated circuit 506. Dialer 502 may make a connection to a telephone line without need for running wiring by using cordless phone circuitry to connect to a local phone line through send/receive integrated circuit 510 which may be in a local building such as a house where the environmental equipment is a wastewater system, as described hereinbefore in connection with FIG. 8. In this example, each service personnel might be given ID device 500 which may be in the form of a readable card, badge, or the like. Upon reaching location, a button or any other means on device 500 may be activated to send ID information such as the service personnel's identification number. The button may also be pressed upon leaving thereby providing a record of how long and when the service personnel was on location. The service personnel detection information may then be sent to server 25 (See FIG. 2) through line 508. If dialer 502 does not have a send/receive integrated circuit and instead uses a hard wired line, then the send/receive chip may be built in or may be added by connecting module 512 to a connector on dialer 502 whereby module 512 contains the appropriate electronics and/or programming.

Figure 13:
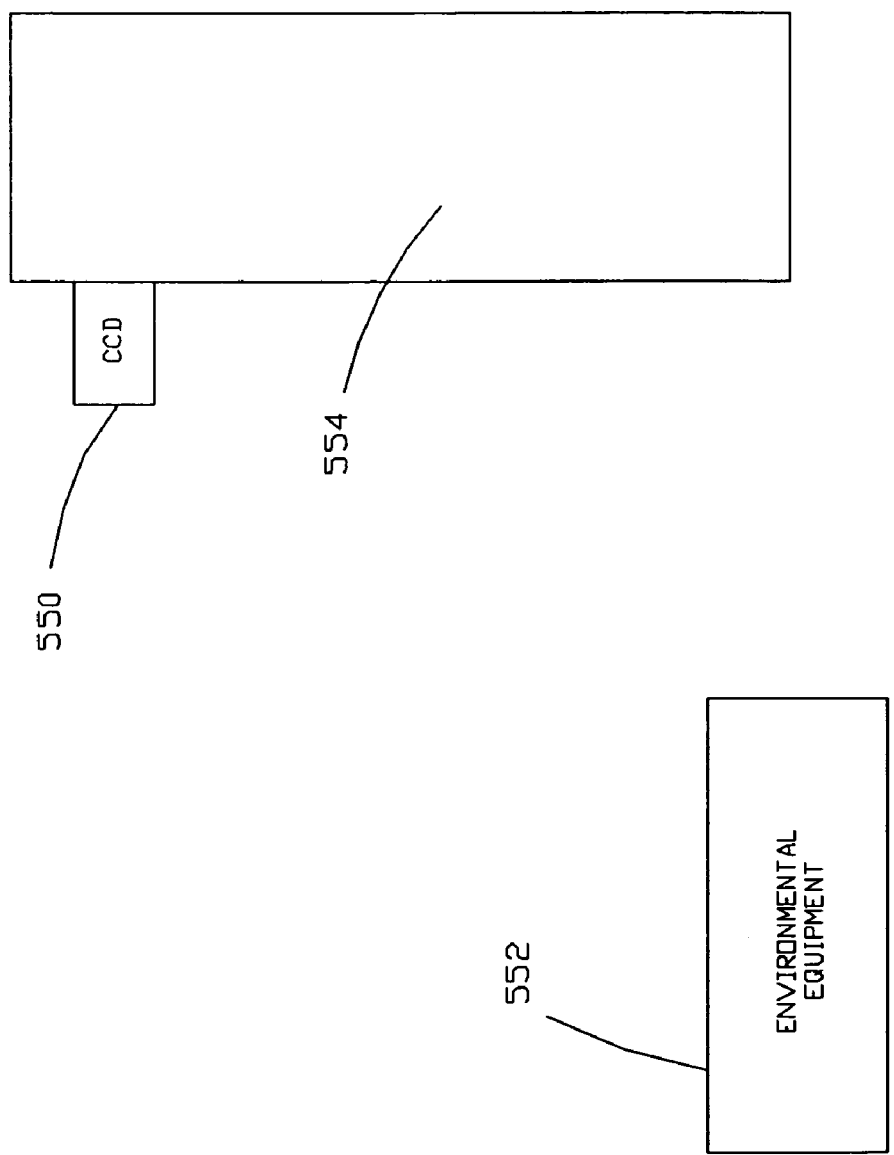
FIG. 13 is a schematic diagram showing one possible embodiment of a personnel detection sensor in the form of a CCD which may also be utilized for remote diagnosis of operation of an environmental equipment system in accord with one possible embodiment of the present invention.

In FIG. 13, one or more low cost video cameras such as charge coupled devices 550 may be utilized for monitoring environmental equipment 552 and/or also for detecting service personnel within a service personnel detection zone which may be formed within a visual range of device 550. The video data may show what the service personnel do, e.g., checking fluid levels. CCD 550 may be activated by pressing a button, by motion or infra red sensors, or by device 500 or the like. As well, video frames may be regularly taken and then discarded except during time periods in which the service personnel were on location. The video may be used in conjunction with other devices discussed hereinbefore or by itself. For purposes of the present invention, a CCD camera sensitive to electromagnetic waves such as light waves may be considered an electromagnetic antenna.

Figure 14:
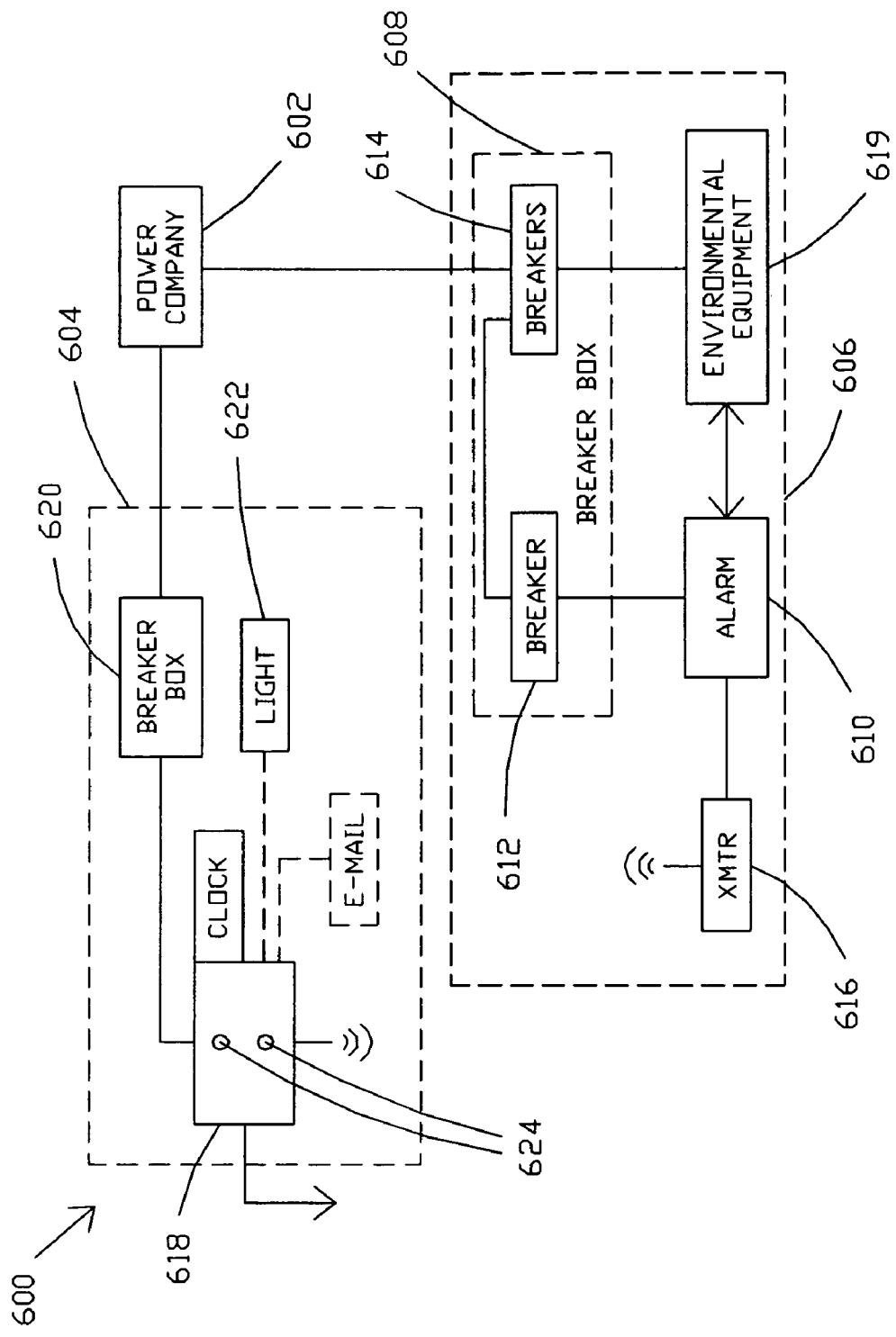
FIG. 14 is a schematic diagram showing an alarm verification system for an alarm circuit in an environmental equipment system in accord with one possible embodiment of the present invention.

FIG. 14 is a schematic diagram showing alarm verification system 600 for verifying that alarm circuit 610 in environmental equipment system 606 is operational, in accord with one possible embodiment of the present invention. In this embodiment of the invention, power is supplied to building 604 and environmental equipment system 606 from power lines of power company 602. This power may typically, but not necessarily, come from a single drop or outlet from a power line transformer.

As discussed above, it will be understood that a large number of environmental equipment systems 606, such as aerobic wastewater treatment systems, are utilized by businesses and homeowners. The business or homeowner building 604 is often located some relatively short distance from the wastewater treatment system 606 as discussed above.

In one preferred embodiment, breaker box 608 may be utilized with the wastewater treatment system 606 to provide circuit overload protection. In this case, alarm circuit 610 may utilize breaker 612 that is separate from the one or more breakers 614 that supply power to other wastewater treatment system electrical components 619. Therefore, if breakers 614 are tripped, then alarm circuit 610 still has power and will be able to sense the failure of operation utilizing one or more sensors as discussed hereinbefore. However, it is possible that breaker 612 that supplies power to alarm circuit 610 could trip. In this case, it would be desirable that this malfunction be detected. As well, it is possible that functionality of alarm circuit 610 may be compromised in other ways. While a self-test may be utilized to verify sensor operation of alarm circuit 610, e.g., motor current sensors, other problems may develop. For instance, transmitter 616 that transmits the alarm signal could fail.

As discussed above, a regularly scheduled heartbeat signal may be sent from wastewater treatment system 606 to remote server 26 or receiver 14 or other server that would indicate a failure in the event that a regularly scheduled transmission is not received. For example only, if a heartbeat signal or regular transmission signal were scheduled for once a month, then a failure may be indicated if the heartbeat signal is not received by server 26 or receiver 14 within that time period. If desired, the heartbeat signal could include any readings from alarm sensors and/or may indicate that a self-test shows that all alarm sensors are within the acceptable range of readings. The heartbeat signal may be sent to a server, such as a third party server or service company server as discussed above, In some cases, the cost of sending the heartbeat signal may be negligible. For instance, if local calls are used or if email or other computer connections are utilized, then a heartbeat signal could be sent to a server very frequently, perhaps several times per day or even more often. However, if telephone costs are not negligible, or it is not desired to utilize the local telephone line except in off hours, it may be desired to reduce costs of sending the heartbeat signal so that, as a non-limiting example, only one heartbeat signal is sent each month or in any desired time period. Alternatively, it may be desired to eliminate the heartbeat signal and call only if there is an actual failure in system 606, whether of alarm circuit 610 or equipment 619. Even when costs associated with transmission of the heartbeat signal are not negligible, it may be desirable that the operational status be verified more frequently than once a month. The present invention provides this functionality and/or other functionality without the need for excessive communication costs or tying up the local telephone line.

If desired, household circuits such as kitchen lights, or the like, could be powered through breaker 612 which also includes alarm circuit 610, as some regulators have indicated may be a desirable option. With such a configuration, the homeowner would be aware of the power failure due to the failure of the kitchen lights or other devices to operate, and would know to take steps to restore power. However, providing a common breaker for the household and alarm circuit 610 may be more costly and require the cost of additional wiring between building 604 and environmental system 606. The present invention also eliminates these costs and results in a more reliable system.

As discussed above, such as in conjunction with FIG. 7-9, system 600 may utilize slave transmitter or slave node 618 for communication with environmental system 606, Transmitter 616 and slave node 618 may also be referred to herein as first and second communication nodes. As also discussed above, local nodes such as slave node 618 may be utilized to check for a heartbeat signal of other locally positioned nodes such as transmitter 616. Accordingly, slave node 618 may be programmed to detect what is referred to herein as a local heartbeat signal from transmitter 616 to slave node 618. Alarm circuit 610 may verify operation, run self-tests or the like, and be programmed to transmit a signal through transmitter 616 to slave node 618 at any desired time interval, e.g., each minute, each hour, or the like. If this local heartbeat signal is not received by slave node 618, then slave node 618 may be programmed to report the failure to receiver 14, server 24, or the like, or wait to report the failure, as discussed below. If the local heartbeat signal is received, then it can be assumed that alarm circuit 610 and transmitter 616 are functioning properly in which case slave node 618 may be programmed, if desired, to provide an external heartbeat signal to the server at some desired interval, e.g., a monthly heartbeat signal to receiver 14 or server 26 or other server to verify operation of environmental system 606. In another possible embodiment, the external heartbeat signal to the remote server may be eliminated as unnecessary in light of the local heartbeat signal between transmitter 616 and slave node 618.

With the local heartbeat signal between alarm circuit 610 and slave node 618, it is possible to verify system operation virtually continuously without incurring the frequent communication costs to receiver 14, server 24, or the like.

In this non-limiting example, slave node 618 may be powered by a house circuit through a standard house breaker box 620, and may be used to turn off or flash house lights 622, flash indicator lights 624, or the like within building 604, to thereby notify the homeowner that power to alarm circuit 606 and/or other environmental equipment 619 has failed. For instance, indicator lights 624 may comprise a green light which stays on when there are no problems and a flashing yellow light that indicates a problem. As another possibility or additionally, slave node 618 may comprise a socket into which a house lamp 622 is connected. Alternatively, slave node 618 may comprise a controller for a house lamp 622 that may be mounted through a power controller, such as are commonly used in house or building lighting systems, e.g. controllers that operate wirelessly or through the house wiring.

When communication to the server is desired, slave node 618 may connect to a server or receiver, as described hereinbefore, e.g. receiver 14 and/or web server 26. Slave node 618 may connect to receiver 14 or web server 26 or other servers or receivers via an 800 or 888 number or other toll free number to avoid long distance phone costs. Alternatively, slave node 618 may connect via local computer network and/or via modem, wirelessly, through cable, through house power line, or the like, to a local ISP (Internet Service Provider) to provide a warning over the Internet. Slave node 618 may comprise a dialer programmed for dialing the desired number, perhaps at off times, e.g., 1 AM to 4 AM, to avoid interference with other phone calls made by the business or homeowner. To further reduce communication costs where groups of environmental systems may be located, if desired, a local number may be provided in the form of a local phone number for the receiver 14 phone number. For example only, if receiver 14 is physically located in Hawaii, a telephone line may be obtained in Hawaii that has a Houston, Tex., telephone number whereby callers in Houston calling to receiver 14 are charged only for a local call instead of a call to Hawaii. Alternatively, the local number of an ISP in Houston, Tex., may be utilized by slave node 618 whereby an Internet connection made by a local call in Houston, Tex., connects through the Internet to a server in Hawaii, without incurring long distance call costs.

As also discussed above, slave node 618 and alarm transmitter 616 may be implemented in many ways. For instance, slave transmitter 618 and alarm transmitter 616 may comprise a cordless telephone link wherein relatively inexpensive cordless telephone integrated circuits may be utilized. Slave node 618 may simply connect to any household telephone outlet and may be plugged into a power socket for power. In this embodiment, as discussed above, service personnel may carry a badge or device with a similar cordless telephone integrated circuit to connect to alarm transmitter 616 and/or slave node 618 to verify their presence at environmental system 606, as discussed hereinbefore.

Slave node 618 could be implemented in other ways. For instance, slave node 618 may be programmed to call an ISP to communicate through the Internet directly to server 24 or another server. ISPs may be selected which utilize local telephone numbers to reduce phone charges. Heartbeat calls or communications to the server may include cumulative data from multiple local heartbeat signals and may include the times related to the malfunction. As well, any desired updates or changes to desired reporting frequency, additional local telephone numbers to connect to the ISP from the server, or the like, could be implemented by automatic downloads during scheduled reporting times, Alternatively, local telephone numbers may be set up for receiving local calls to a remotely located receiver 14 without long distance phone costs, as also discussed above.

Many possible constructions are available for slave node 618. Instead of being a box that plugs into a wall socket, slave node 618 may be a circuit board that connects to a local computer and/or may comprise a wireless connection to a local network or the like. Other potential constructions of slave node 618 are described above, such as in conjunction with FIG. 3 and FIG. 7-10.

Figure 15:
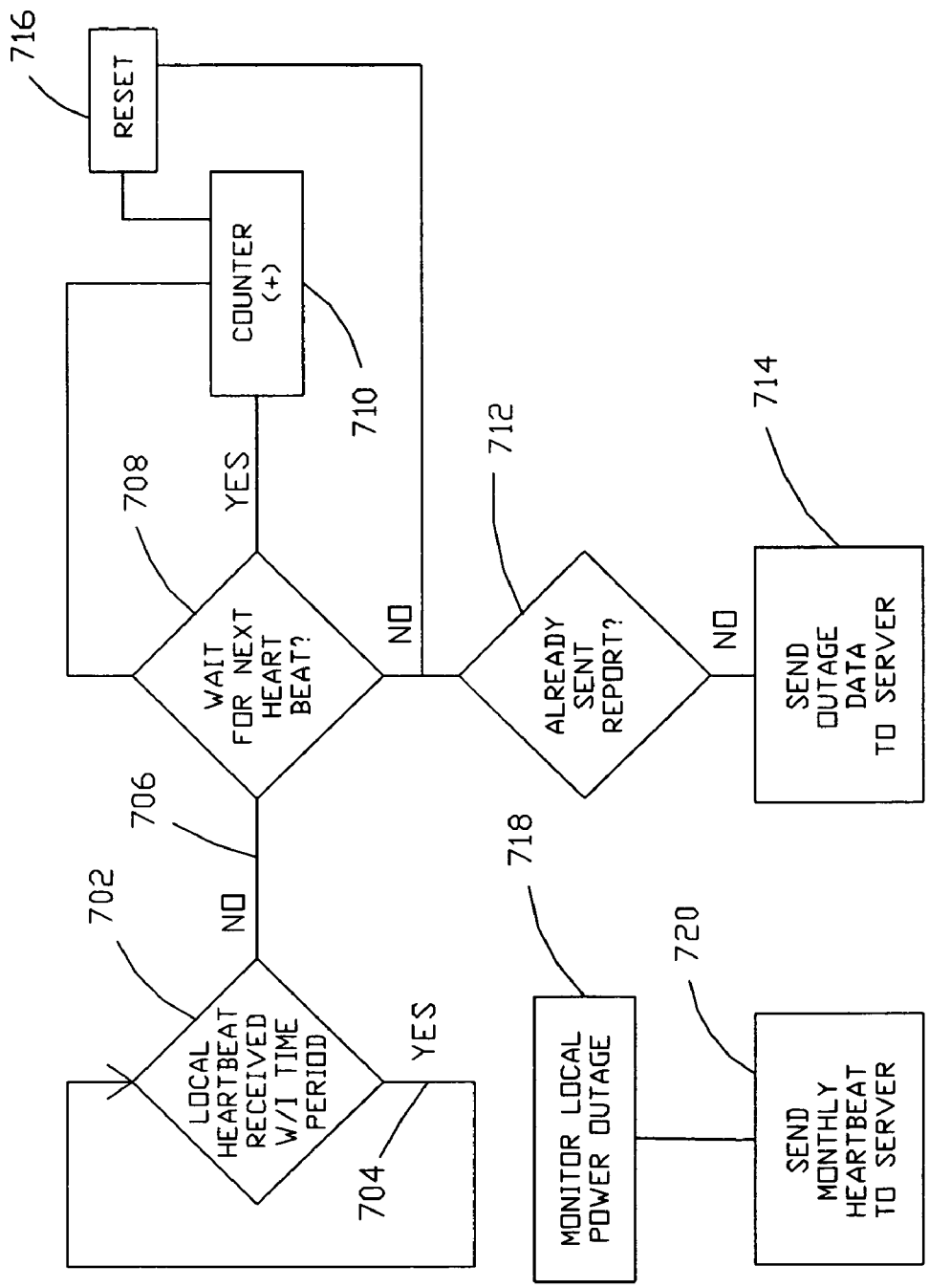
FIG. 15 is a flow diagram which describes operation of an alarm verification system in accord with one possible embodiment of the present invention.

FIG. 15 is a flow diagram for operation of slave node 618 which describes operation of alarm verification system 600 in accord with one possible embodiment of the present invention. In this embodiment, slave node 618 continuously monitors for a local heartbeat or transmission from transmitter 616 as indicated by decision block 702. The time period may be virtually any time period, e.g., each second, minute, hour, or the like. A clock or timer may be provided in slave node 618 for this purpose. Slave node 618 does not need to make a connection to receiver 14 or server 24 or other remotely located server for this purpose. Thus, it is not necessary to incur telephone costs or tie up the local telephone line as slave node 618 monitors for heartbeat transmissions from transmitter 616. So long as the local heartbeat signal is received as indicated at 704, then the operation of alarm 610 is verified.

If the heartbeat signal is not received within a specified time period as indicated at 706, then it may be desirable to provide a period during which slave node 618 waits before reporting a problem. The absence of the heartbeat signal may be temporary due to servicing of the unit by service personnel or other short term outages. Thus, in decision box 708 a comparison may be made between the elapsed time since the last heartbeat signal was received and the present time. If the time is less than a desired elapsed time before reporting, e.g., 12 hours, and/or an early morning reporting time, e.g., 1 AM to 3 AM, then counter 710 may be used to count the elapsed time or a clock may be utilized for comparison with a desired reporting time, or other data may be utilized for making this determination.

If the elapsed time has expired, or if the desired reporting time is present, then a second check may be made as indicated at decision box 712. For instance, it may be desirable to send the report only once to avoid wasting phone costs and/or tying up the local line. If the report has not been sent in, it may be desirable for slave node 618 to then contact receiver 14, server 24, or any desired location to report the problem, as indicated at 714.

The report may state the time period during which the local heartbeat signal was not received. The report may be viewed by third party operators, regulators, respective service personnel, and the system owner. The information may be sent to a service company who may be able to fix the problem remotely such as by calling the homeowner and asking that the breaker 612 be checked. If this solves the problem, then a reset signal may be generated by transmitter 616 and/or by slave node 618 as indicated at 712 so that should another heartbeat signal be received, then the selected waiting period before reporting will start again.

If desired, a monthly, bimonthly, or other time period heartbeat signal may be sent from slave node 618 to a remote server or receiver to verify that the connection between slave node 618 and the remote server or receiver is operational, as indicated at 718 and 720. However, due to the absence of a working phone line, or warning lights 624 or 622, the homeowner is likely to notice and repair such conditions. For instance, if the phone line goes out, then because the line is preferably the same line which the homeowner may normally use, it is likely the homeowner will get this repaired. Likewise, if a breaker in breaker box 620 is tripped, the absence of a circuit is likely to be noticed and repaired. As well, power company 602 may provide outage information that may be monitored by receiver 14 or server 24, as indicated at 718.

Accordingly, in one possible embodiment, the present invention provides a system which utilizes slave node 618 to verify operation of alarm circuit 610 at relatively frequent intervals, e.g., hourly, without the need for continuously contacting a remotely located server or receiver, e.g., server 26, receiver 14, or the like.

The foregoing disclosure and description of the invention is therefore illustrative and explanatory of a presently preferred embodiment of the invention and variations thereof, and it will be appreciated by those skilled in the art that various changes in the design, organization, order of operation, means of operation, equipment structures and location, methodology, and use of mechanical/electrical/software equivalents, as well as in the details of the illustrated construction or combinations of features of the various elements, may be made without departing from the spirit of the invention. As well, the drawings are intended to describe the concepts of the invention so that the presently preferred embodiments of the invention will be plainly disclosed to one of skill in the art but are not intended to be manufacturing level drawings or renditions of final products and may include simplified conceptual views as desired for easier and quicker understanding or explanation of the invention. As well, the relative size and arrangement of the components may be greatly different from that shown and still operate within the spirit of the invention as described hereinbefore and in the appended claims. It will be seen that various changes and alternatives may be used that are contained within the spirit of the invention.

Accordingly, because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative of a presently preferred embodiment and not in a limiting sense.

What is claimed is:

1. A method for verifying operation of an alarm systems in an environmental equipment system, said method comprising:

mounting a first communication node physically proximate said alarm system for said environmental equipment system, said first communication node being in electronic communication with said alarm system;

mounting a second communication node within wireless communication range of said first communication node, said second communication node being operable for electronically communicating with said first communication node and with at least one remotely located server, said first communication node communicating only with said second communication node;

programming said first communication node to send a first verification signal to verify operation of said alarm system by said second communication node at a first predetermined interval; and programming said second communication node to detect when said first verification signal is not received at said first predetermined interval.

2. The method of claim 1, further comprising programming said second communication node to send a second verification signal to verify operation of said alarm to said at least one remotely located server at a second predetermined interval, and programming said at least one server to detect when said second verification signal is received.

3. The method of claim 1, further comprising programming said second communication node such that when said second communication node detects that said first verification signal is not received at said first predetermined interval, then one or more predetermined criteria are checked to determine whether or not said second communication node sends a notification signal to said at least one server that said alarm system is not operational.

4. The method of claim 3, wherein said one or more predetermined criteria comprise determining whether said first verification signal is not received for a preselected number of said first predetermined intervals.

5. The method of claim 3, wherein said one or more predetermined criteria comprise determining whether said notification signal has already been sent to said at least one server.

6. The method of claim 1, further comprising providing a cordless telephone connection for said electronic communication between said first communication node and said second communication node.

7. The method of claim 1, further comprising connecting said environmental equipment system to a power line through a first breaker, connecting said alarm system to said power line through a second breaker, and connecting said second node through a third breaker.

8. The method of claim 7, further comprising utilizing said second communication node to produce a visual signal physically adjacent to said second communication node when said first verification signal is not received at said first predetermined interval.

9. The method of claim 1, comprising configuring said second node to connect only to a phone system.

10. A system for verifying operation of an alarm system of an environmental equipment system, said system comprising:
a first communication node for said alarm system wherein said first communication node is mounted physically proximate to said environmental equipment system;
a second communication node wherein said second communication node is mounted within wireless communication range of said first communication nodes, said second communication node being operable for electronically communicating with said first communication node and with at least one remotely located server, said first communication node communicating only with said second communication node;
said first communication node being programmed to send a first verification signal to verify operation of said alarm system to said second communication nodes at first predetermined interval; and
said second communication node detecting when said first verification signal is not received at said first predetermined interval.

11. The system of claim 10, wherein said second communication node is programmed to send a second verification signal to verify operation of said alarm to said remotely located server at a second predetermined interval, and said at least one server being programmed to detect when said second verification signal is received.

12. The system of claim 10, wherein said second communication node is programmed to detect that when said first verification signal is not received at said first predetermined intervals, then one or more predetermined criteria are checked to determine whether or not said second communication node sends a notification signal to said at least one server that said alarm system is not operational.

13. The system of claim 12, wherein said one or more predetermined criteria comprise determining whether said first verification signal is not received for a preselected number of said first predetermined intervals.

14. The system of claim 12, wherein said one or more predetermined criteria comprise determining whether said notification signal has already been sent to said at least one server.

15. The system of claim 10, further comprising a cordless telephone connection between said first communication node and said second communication node.

16. The system of claim 10, further comprising a first breaker connecting said environmental equipment system to a power line, a second breaker connecting said alarm system to a power line, and a third breaker connecting said second node to a power line.

17. The system of claim 16, further comprising one or more visual indicators physically adjacent to said second communication node controlled by said second communication node wherein said second communication node is responsive to tripping of said second breaker to produce a visual signal.

18. The system of claim 10, comprising said second node being configured to connect only to a phone system.

* * * * *